(12) United States Patent
Stratton et al.

(10) Patent No.: US 9,742,208 B2
(45) Date of Patent: Aug. 22, 2017

(54) ELECTRICAL CHARGING CASE FOR WIRELESS HEADSETS

(71) Applicant: Headphone Events, Inc., Manchester, NH (US)

(72) Inventors: Alan Kenneth Stratton, Milford, NH (US); Roy Elliott Whitson, III, Franklin, NH (US); Michael Varanka, Amherst, NH (US)

(73) Assignee: Headphone Events, Inc., Woburn, MA (US)

(*) Notice: Subject to any disclaimer, the term of this patent is extended or adjusted under 35 U.S.C. 154(b) by 188 days.

(21) Appl. No.: 14/878,043

(22) Filed: Oct. 8, 2015

(65) Prior Publication Data

US 2017/0104352 A1 Apr. 13, 2017

(51) Int. Cl.
*H02J 7/00* (2006.01)

(52) U.S. Cl.
CPC ............ *H02J 7/0044* (2013.01); *H02J 7/007* (2013.01); *H02J 7/0013* (2013.01); *H02J 7/0045* (2013.01)

(58) Field of Classification Search
CPC ....... Y02E 60/12; H02J 7/0042; H02J 7/0045; H01M 10/46; H01M 10/44
USPC .......................................................... 320/107
See application file for complete search history.

(56) References Cited

U.S. PATENT DOCUMENTS

| | | | |
|---|---|---|---|
| 3,297,932 | A | 1/1967 | Murphy |
| 3,315,375 | A | 4/1967 | Heinz |
| 3,906,160 | A | 9/1975 | Nakamura et al. |
| 4,229,829 | A | 10/1980 | Grunwald |
| D283,464 | S | 4/1986 | Ogden |
| 4,920,570 | A | 4/1990 | West et al. |
| 5,642,426 | A | 6/1997 | Neuman et al. |
| 5,734,964 | A | 3/1998 | Fishman et al. |
| D420,324 | S | 2/2000 | Wan |
| D444,122 | S | 6/2001 | Krieger et al. |
| D446,500 | S | 8/2001 | Krieger et al. |
| D473,516 | S | 4/2003 | Gresham et al. |

(Continued)

OTHER PUBLICATIONS

Hardcase International Ltd, Webpages featuring drum cases, Mar. 6, 2015, pp. 1-6, Hardcase Int'l. Ltd, Derbyshire, England, http://www.hardcase.com/cases/caixa.

(Continued)

*Primary Examiner* — Arun Williams
(74) *Attorney, Agent, or Firm* — Lawrence P. Trapani, Esq.

(57) ABSTRACT

A charging case for a plurality of headsets is disclosed. Each headset includes two headphone units connected together in opposing relationship along a diametric axis by a headband. Each headset contains a battery and a charge receiving circuit coupled to the battery. The charging case comprises a portable, cylindrically shaped carrying case and a charging station contained in the carrying case. The charging station includes a plurality of charging receptacles and a charge distribution circuit. The charging receptacles are disposed in a circular pattern about a center area and are configured to support the headsets, respectively, in an orientation where the diametric axes of the headsets are positioned radially in the circular pattern. The distribution circuit distributes electricity to the charging receptacles. At each receptacle electricity is transferred to the charge receiving circuit of a headset when the headset is in the receptacle, to charge the battery of the headset.

29 Claims, 14 Drawing Sheets

(56) References Cited

U.S. PATENT DOCUMENTS

| | | | |
|---|---|---|---|
| D483,014 S | 12/2003 | Hsiao | |
| 6,710,577 B1 | 3/2004 | Shum | |
| 6,876,172 B2 | 4/2005 | Lam et al. | |
| D506,436 S | 6/2005 | Cheung et al. | |
| D508,458 S | 8/2005 | Solland et al. | |
| D525,583 S | 7/2006 | Vu | |
| D526,973 S | 8/2006 | Gates et al. | |
| D534,861 S | 1/2007 | Lam | |
| D539,732 S | 4/2007 | Aglassinger | |
| D543,350 S | 5/2007 | Sanderson | |
| D548,688 S | 8/2007 | Fee et al. | |
| D550,614 S | 9/2007 | Fee et al. | |
| D572,654 S | 7/2008 | Kang et al. | |
| 7,457,649 B1 | 11/2008 | Wilson | |
| D586,743 S | 2/2009 | Guccione et al. | |
| D591,674 S | 5/2009 | McConnell | |
| D601,497 S | 10/2009 | Aglassinger | |
| 7,609,026 B2 | 10/2009 | Tsunoda | |
| 7,638,971 B2* | 12/2009 | Guccione | H02J 7/0027 320/107 |
| 7,639,832 B2 | 12/2009 | Mann et al. | |
| 7,642,744 B2 | 1/2010 | Zedell, Jr. | |
| D623,129 S | 9/2010 | Kawakami et al. | |
| D629,355 S | 12/2010 | Bodley et al. | |
| D645,818 S | 9/2011 | Guccioine et al. | |
| D650,326 S | 12/2011 | Yen | |
| D651,561 S | 1/2012 | Petrie et al. | |
| D654,017 S | 2/2012 | Lentine | |
| 8,275,143 B2 | 9/2012 | Johnson | |
| 8,378,624 B2 | 2/2013 | Boyles et al. | |
| 8,441,230 B2 | 5/2013 | Boyles et al. | |
| 8,488,822 B2 | 7/2013 | Klemmensen | |
| D691,086 S | 10/2013 | Custon et al. | |
| 8,587,261 B2 | 11/2013 | Sassen et al. | |
| D695,215 S | 12/2013 | Neidhart et al. | |
| 8,610,402 B2 | 12/2013 | Giribet Guadamillas | |
| D700,571 S | 3/2014 | Guccione et al. | |
| D704,627 S | 5/2014 | Huang | |
| D717,050 S | 11/2014 | Henry et al. | |
| 2002/0115480 A1 | 8/2002 | Huang | |
| 2004/0085043 A1 | 5/2004 | Germagian et al. | |
| 2006/0261778 A1 | 11/2006 | Elizalde Rodarte | |
| 2007/0182367 A1* | 8/2007 | Partovi | H01F 5/003 320/108 |
| 2007/0256946 A1 | 11/2007 | Godshaw et al. | |
| 2009/0058356 A1 | 3/2009 | Lee et al. | |
| 2009/0295328 A1 | 12/2009 | Griffin, Jr. | |
| 2010/0320961 A1 | 12/2010 | Castillo et al. | |
| 2014/0002004 A1 | 1/2014 | Farris-Gilbert et al. | |
| 2014/0044281 A1* | 2/2014 | Ganem | H04R 3/00 381/94.6 |

OTHER PUBLICATIONS

Humes & Berg Mfg. Co., Inc., Webpages featuring 4.5 X 10 Enduro Snare Drum Case, Mar. 6, 2015, pp. 1-4, Humes & Berg Mfg. Co., Inc., East Chicago, IN, http://www.humesandberg.com/product_detail.php?product=511.

Infocus Soft Carrying Case for Projector, Images of actual product, showing case, handle, and pouches to organize cables, padded interior, Jan. 1, 2015, pp. 1-9, Infocus Corporation, Portland, OR, http://www.infocus.com/accessories/cases/CA-SOFTCASE-MTG.

Headphone Events, Inc., Ultimate Guide to Silent Disco, Jan. 2014, pp. 1-19, Headphone Events, Inc., Ithaca, NY.

Williams Sound, LLC, CHG 1012/ PRO, Digi-Wave(TM), 12-Bay Charger, Specification Sheet, Oct. 2013, pp. 1-2, Williams Sound, LLC, Eden Prairie, MN.

The Gadgeteer, Andy Chen, Eggtronic HUB IT USB HUB Review, Aug. 2014, pp. 1-9, The Gadgeteer, http://the-gadgeteer.com.

lightinthebox.com, Dual Charger for PS3 Controller (#01710602), Feb. 2015, p. 1, Lightinthebox.com http://www.lightinthebox.com/dual-charger-for-ps3-controllor_p1710602.html?currency=USD&.

SKB, Pro Audio / Video & Camera, Ultimate Protection and Effortless Mobility Catalog, Jan. 28, 2014, pp. 1-32, SKB, Orange, CA.

* cited by examiner

ELECTRICAL CHARGING CASE FOR WIRELESS HEADSETS

BACKGROUND OF THE INVENTION

Field of Invention

The present invention relates generally to electrical charging stations for wireless headphones, and more particularly to a charging station incorporated into a portable carrying case for storing and charging multiple sets of battery-powered headphones.

Background Art

Wireless Headphones and other headphones requiring a cordless power source (e.g., a battery) are usually provided with an electrical charging station. Examples of such headphones and charging stations are disclosed in: U.S. Pat. No. 7,639,832 to Mann et al; U.S. Pat. No. 7,609,026 to Tsunoda; and U.S. Pat. No. 7,457,649 to Wilson. If a number of sets of headphones (or headsets) are supplied, e.g., as part of a group listening system or other multi-user system, the charging station may be designed to accommodate and charge all of the headsets simultaneously ("multi-unit charging station"). Examples of multi-unit charging stations for wireless headsets are disclosed in U.S. Pat. No. 8,275,143 to Johnson (a rack configuration) and U.S. Pat. No. 4,229,829 to Grunwald (a cabinet configuration).

A group listening system generally includes a transmitter (e.g., radio frequency, infrared, WiFi, etc.) and a number of wireless receivers. The wireless receivers may be embodied in wireless headsets. The transmitter is connected to an audio source, such as, for example, a television set, DVD player. CD player, mp3 player, smart phone, or microphone. In use, the transmitter wirelessly transmits the audio from the audio source to the multiple wireless headset receivers, the latter being worn by a group of listeners. A group listening system may be an assistive listening system used at a senior citizen center or assisted living residence. When not in use, the transmitter and headset receivers are usually kept in a portable, handled case for storage and transportation. A typical shape for such a case is rectangular. One problem to be solved when designing such a case is how to arrange the headsets inside the case. A linear arrangement is typically used in a rectangular case, i.e., arranged in a single row or multiple rows. Sometimes, the headsets are simply stacked inside the case. A need exists for an alternative arrangement of wireless headsets in a portable case, one that is orderly and balanced, and one that provides convenient access to the headsets for removal from and placement into the case.

As indicated, wireless headsets are battery-powered and, in a group listening system, the transmitter may also be battery-powered. These battery-powered components require periodic charging, and a multi-unit charging station is usually provided for this purpose. In light of the usual requirement for both a carrying case and a charging station for the battery-powered components, one might consider whether to combine the charging station with the carrying case. In addition to holding the headsets and transmitter in a carrying case for storage, should these components also be held in the case for charging? It would be a convenient feature to combine both functions. However, a number of considerations arise if the carrying case is to function as a charging station ("charging case"). For instance: how are the headsets to be supported in the case; how are the headsets best arranged for both charging and storage; and, if a transmitter is included, where is the transmitter to be located (in the case) relative to the headsets. Examples of charging cases for electronic devices are shown in U.S. Patent App. Pub. No. 2014/0002004 to Ferris-Gilbert et al. and U.S. Patent App. Pub. No. 20040085043 to Germagian et al. A need exists for a charging case that provides a convenient, orderly and balanced arrangement for the wireless headsets when placed in the case for charging and storage. The arrangement should be as compact as possible and be able to neatly accommodate the transmitter among the headsets.

Another consideration for a charging case is how best to layout the electrical charging circuitry in the case. If not laid out properly, the circuitry may be vulnerable to mechanical shock, vibrations, and stresses normally experienced in a case during transportation, storage or other use. In addition, if the layout of the circuitry is too complex, it may adversely affect reliability and add to the cost of materials and manufacture. Moreover, if the circuitry is not adequately protected, it may be susceptible to corrosion, which would affect reliability and shorten the life of the charging case.

The present invention addresses the above-mentioned problems and considerations by utilizing a round charging case and organizing the wireless headsets and transmitter in a "spoke and hub" arrangement. The present invention optimally locates the electrical charging circuitry inside the round case. Electrical charging circuits having a hub arrangement are disclosed in the following U.S. Patent documents: 2014/0002004 to Ferris-Gilbert et al.; U.S. Pat. No. 8,587,261 to Sassen et al.; U.S. Pat. No. 8,441,230 to Boyles et al.; U.S. Pat. No. 8,378,624 to Boyles et al.; U.S. Pat. No. 7,638,971 to Guccione et al.; 2009/0058356 to Lee et al.; U.S. Pat. No. 6,710,577 to Shum; D473,516 to Gresham et al.; and U.S. Pat. No. 3,297,932 to Murphy.

OBJECTS AND SUMMARY OF THE INVENTION

It is an object of the present invention to provide a portable charging case for multiple wireless headsets which addresses the problems associated with the prior art.

It is another object of the present invention to provide a portable carrying case for multiple wireless headsets which incorporates a charging station for the headsets.

It is a further object of the present invention to provide a portable charging case configured to charge multiple wireless headsets and other electronic devices simultaneously from a single power source.

It is still another object of the present invention to provide a portable charging case for wireless headsets that presents an orderly and balanced arrangement of the headsets and provides convenient access to the headsets for removal out of or placement into the case.

It is still a further object of the present invention to provide a portable charging case for wireless headsets that supports the headsets in a relatively compact arrangement.

It is yet another object of the present invention to provide a portable charging case for a group listening system having a number of wireless headsets and a transmitter, the arrangement of which in the case neatly accommodates the transmitter among the headsets.

It is yet a further object of the present invention to provide a portable charging case for wireless headsets, the charging circuitry of which is protected against mechanical shock, vibration or stresses.

It is still yet another object of the present invention to provide a portable charging case for wireless headsets, the charging circuitry of which is reliable and low cost.

These and other objects are attained in accordance with the present invention, wherein there is provided, in one exemplary embodiment, an electrical charging case for storing and charging a plurality of headsets. Each headset includes first and second headphone units connected together in opposing relationship along a diametric axis by a headband. Each headset contains a battery and a charge receiving circuit coupled to the battery. The charging case comprises a portable carrying case and a charging station contained in the carrying case. The charging station includes a plurality of charging receptacles and a charge distribution circuit. The charging receptacles are disposed in a circular pattern about a center area. The receptacles are configured to receive and support the plurality of headsets, respectively, in an orientation where the diametric axes of the headsets are positioned radially in the circular pattern. The charge distribution circuit is coupled to the plurality of charging receptacles and distributes electricity to each of the charging receptacles. The charge distribution circuit has a charge transfer mechanism (e.g., pogo-pins) associated with each of the charging receptacles. The charge transfer mechanism of each receptacle transfers the electricity distributed to the receptacle to the charge receiving circuit of a headset of the plurality of headsets when the headset is supported in the receptacle. The battery of the supported headset is charged by the electricity received from the charge receiving circuit.

In at least one embodiment, the charging station of the charging case further includes a charging bay located at the center area. The charging bay is configured to receive and support a transmitter. The transmitter is adapted to wirelessly transmit audio signals to the plurality of headsets, for example, as part of a group listening system. The transmitter contains a battery and a charge receiving circuit coupled to the battery. The charge distribution circuit is further coupled to the charging bay for distributing electricity to the bay. The charge distribution circuit has a charge transfer mechanism (e.g., pogo-pins) for transferring electricity from the bay to the charge receiving circuit of the transmitter (when the transmitter is supported in the bay). The battery of the transmitter is charged by the electricity received from the charge receiving circuit of the transmitter.

In another embodiment, the portable carrying case contains a storage space bound by a cylindrical wall, and the charging receptacles are contained in the storage space and are closely spaced in the circular pattern. The circular pattern of the charging receptacles may also be in close concentric relationship with the cylindrical wall. In those embodiments having a charging bay, the bay is in close concentric relationship with the circular pattern of the charging receptacles.

In a more specific embodiment, the portable carrying case has a base shell and a lid shell. The lid shell is connected to the base shell by a hinge. The lid shell is movable about the hinge between a closed position and an open position. In the closed position, the lid shell is positioned together with the base shell such that the case is closed. In the open position, the lid shell is away from the base shell such that the case is open. The base shell may have a circular base panel and a cylindrical base wall extending substantially perpendicular to and around the circular base panel, to define a base compartment. The lid shell may have a circular lid panel and a cylindrical lid wall extending substantially perpendicular to and around the circular lid panel, to define a lid compartment. Further, the cylindrical base wall and the cylindrical lid wall each may have a flat segment. The flat segments adjoin each other and are joined together by the hinge. The flat segments together form a case base when the carrying case is closed. The case base supports the case in an upright position. The cylindrical lid wall has an interior side associated with the lid compartment and an exterior side. The case may further include a handle mounted to the exterior side of the lid wall at a point opposing the case base. The handle can be used to manually carry the case when the case is closed.

In another embodiment, the charging station may further include a base containing the charging receptacles. The base may be a separate part from the charging receptacles, where the charging receptacles are received and secured in the base. On the other hand, the base and the charging receptacles may be integrally formed in a unitary structure. The unitary structure may be made of foam material (e.g., EVA) or a plastic material (e.g., PC/ABS). If a charging bay is included in the charging station, the base, the charging receptacles and the charging bay may be integrally formed in a unitary structure. In a specific embodiment where the base is made of foam, a top side of the base contains a plurality of receptacle openings in which the charging receptacles are mounted, respectively. The foam base may further contain a center hole extending through the base from the top to a bottom side. The center hole is in substantial registration with the center area associated with the circular pattern of the charging receptacles. In those embodiments having a charging bay, the charging bay is located in and extends through the center hole of the foam base.

In a further embodiment (or a variation of the above embodiments), the charge distribution circuit includes a plurality of individual charging circuits coupled to the plurality of charging receptacles, respectively. In embodiments utilizing a foam base, the individual charging circuits may be mounted to the foam base, on the bottom side, in substantial alignment with the charging receptacles, respectively. The foam base helps dampen vibrations, shocks, and shear and torsion stresses that may otherwise adversely impact the individual charging circuits.

In some embodiments, the headsets are considered part of the electrical charging case. In these embodiments, the electrical charging case comprises: (a) a plurality of wireless headsets; (b) a portable carrying case; and (c) a charging station contained in the carrying case. Each headset includes a pair headphone units connected together in opposing relationship along a diametric axis by a headband. Each headset contains a battery and a charge receiving circuit coupled to the battery. The charging station includes—(i) a plurality of charging receptacles, and (ii) a charge distribution circuit. The charging receptacles are disposed in a circular pattern about a center area, and are configured to receive and support the plurality of headsets, respectively, in an orientation where the diametric axes of the headsets are positioned radially in the circular pattern. The charge distribution circuit is coupled to the plurality of charging receptacles, for distributing electricity to each of the receptacles. The charge distribution circuit has a charge transfer mechanism (e.g., pogo-pins) associated with each of the charging receptacles. The charge transfer mechanism of each receptacle transfers the electricity distributed to the receptacle to the charge receiving circuit of a headset of the plurality of headsets when the headset is supported in the receptacle. The battery of the supported headset is charged by the electricity received from the charge receiving circuit of the headset.

A method of storing and charging a plurality of wireless headsets is also within the scope of the present invention. Each headset includes a pair of headphone units connected together in opposing relationship along a diametric axis by a headband. Each headset contains a battery and a charge receiving circuit coupled to the battery. In one embodiment, the method comprises the steps of: (a) utilizing a portable carrying case; (b) utilizing a charging station contained in the portable carrying case; (c) supporting the plurality of headsets in the charging station, in a circular pattern about a center area and in an orientation where the diametric axes of the headsets are positioned radially in the circular pattern; (d) distributing electricity to the charging station; and (e) transferring the electricity from the charging station to the charge receiving circuits of the plurality of headsets, whereby the batteries of the headsets receive the electricity and are charged thereby. The method may further comprise the steps of: (f) utilizing a charging bay at the center area, where the charging bay is configured to support a transmitter and the transmitter contains a battery and a charge receiving circuit coupled to the battery; (g) supporting the transmitter in the charging bay; (h) distributing electricity to the charging bay; and (i) transferring the electricity from the charging bay to the charge receiving circuit of the transmitter, whereby the battery of the transmitter receives the electricity and is charged thereby.

BRIEF DESCRIPTION OF THE DRAWING

Further objects of the present invention will become apparent from the following description of the preferred embodiments, with reference to the accompanying drawing, in which:

FIG. 10A shows the headset supported in a charging receptacle, FIG. 10B shows the headset with the charging receptacle removed to illustrate physical and electrical contact between the headset and a charge transfer mechanism, and FIG. 10C shows the headset with a dome removed to reveal a charge receiving circuit and a battery;

FIG. 11A is a top perspective view of the tower, FIG. 11B is a bottom perspective view of the tower. FIG. 11C is an elevation view of the tower, and FIG. 11D is a top plan view of the tower;

FIG. 12A shows the transmitter secured in the charging tower of FIG. 11A, FIG. 12B shows a bottom view of the transmitter to illustrate electrical contacts and latch hook slots for engaging the charging tower, and FIG. 12C shows a bottom view of the transmitter with a bottom plate made transparent to show the electrical contacts, a charge receiving circuit, and a battery of the transmitter;

FIG. 13A is a bottom view of the PCBA showing a receptacle charging circuit, FIG. 13B is a top view of the PCBA, and FIG. 13C is a schematic of the receptacle charging circuit;

FIG. 14A is a bottom view of the PCBA showing a transmitter charging circuit, FIG. 14B is a top view of the PCBA, and FIG. 14C is a schematic of the transmitter charging circuit;

DETAILED DESCRIPTION OF THE PREFERRED EMBODIMENT

Figure 1:
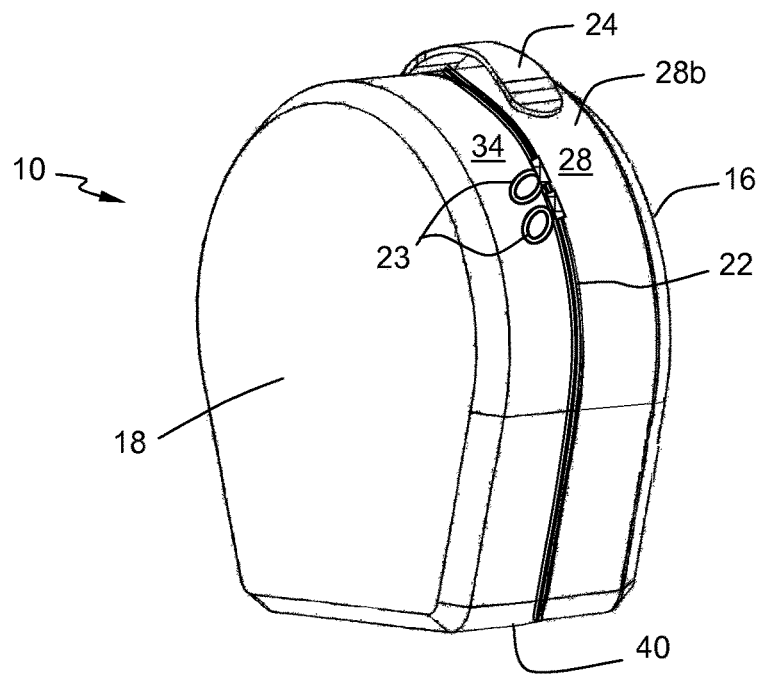
FIG. 1 is a perspective view of one embodiment of an electrical charging case of the present invention, shown in a closed position and resting upright on a flat case base.
Figure 2:
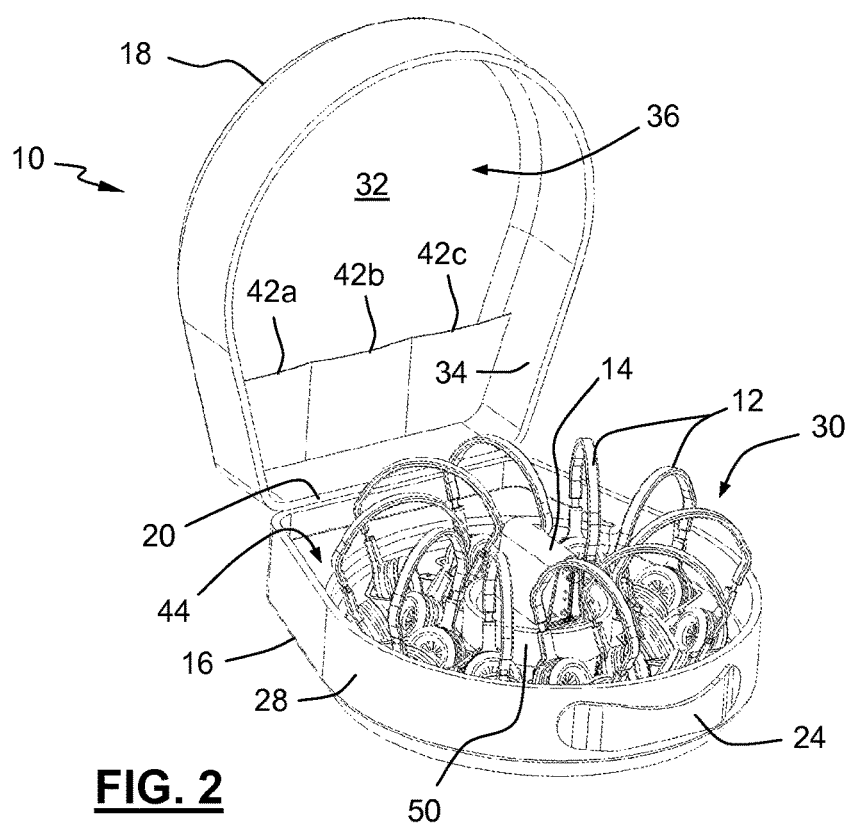
FIG. 2 is a perspective view of the electrical charging case of FIG. 1, shown in an open position revealing its contents, including a charging station, 10 wireless headsets, and one transmitter.

Referring to FIGS. 1 and 2, an electrical charging case 10 is configured to store and electrically charge ten battery-powered wireless headsets 12 and one battery-powered transmitter 14. Transmitter 14 is adapted to wirelessly transmit audio signals (e.g., containing audio programming) to wireless headsets 12. Headsets 12 and transmitter 14 may, for example, be part of a group listening system or an assistive listening system. Charging case 10 includes a carrying case portion having a base shell 16 and a lid shell 18. Shells 16 and 18 are connected together by a hinge 20. Lid shell 18 is movable about hinge 20, between a closed position (FIG. 1) and an open position (FIG. 2). In the opened position, lid shell 18 may be approximately at right angles to base shell 16 (FIG. 2), or the lid shell may swing open beyond right angles, up to or beyond 180 degrees. Hinge 20 may be fashioned in any well-known manner. The type of hinge may depend on the material chosen for the carrying case portion of case 10. For example, the hinge may be a simple plastic web hinge created as part of the injection molding processes, or it may be a sewn hinge if case 10 is made of, e.g., fabric, leather or a leather-like material. Another example is a metal (e.g., brass) hinge. As shown in FIG. 1, when lid shell 18 is in the closed position, it is placed together with base shell 16, such that case 10 is closed. In this embodiment, case 10 is secured closed by a two-way, closed-ended zipper 22 extending around the open edges or rims of base shell 16 and lid shell 18, as generally illustrated in FIG. 1. Typically, zipper 22 is opened and closed using a pair of pullers or pull-tabs 23. For simplicity of presentation, zipper 22 is not shown in FIG. 2 or in other figures portraying case 10. Instead of a zipper, case 10 may be secured closed by any well-known latching mechanism customary in the briefcase, attaché case or luggage industry. The carrying case portion of case 10 further includes a handle 24 attached to base shell 16 in any well-known manner (FIGS. 1, 2 & 4).

The terms "cylindrical," "cylindrically shaped," or variations thereof, are to be construed, for the purposes of this disclosure and the claims, to include classic geometric cylindrical shapes and shapes that vary from classic shapes, such as the generally cylindrical shape of case 10 shown in FIG. 1. These terms include shapes that bear a resemblance to classic geometric cylindrical shapes, for example, shapes that are identified as being generally round, having rounded features, or possessing some degree of circularity in cross-section. The term "circular" is to be construed, for the purposes of this disclosure and the claims, to include a classic geometric circle and shapes that vary from a classic circle, such as shapes that are substantially circular or even just generally circular.

As best shown in FIG. 1, case 10 is cylindrically shaped. As best shown in FIG. 4, base shell 16 has a circular base panel 26 and a cylindrical base wall 28. Wall 28 extends substantially perpendicular to and completely around panel 26 to define a base compartment 30. Lid shell 18 has a circular lid panel 32 and a cylindrical lid wall 34. Wall 34 extends substantially perpendicular to and completely around panel 32 to define a lid compartment 36. A general storage space 38 for case 10 is created by base compartment 30 and lid compartment 36. When case 10 is closed, walls 28 and 34 combine to form one cylindrical wall for case 10 (FIG. 1). Storage space 38 is bound by this combined cylindrical wall. Base wall 28 has a flat portion or segment 29 (FIG. 4), and lid wall 34 has a flat portion or segment 35 (FIG. 4). Segments 29 and 35 adjoin each other and are joined together by hinge 20. Segments 29 and 35 combine to form a case base 40 (FIG. 1) when case 10 is closed. Case base 40 supports case 10 in an upright position as shown in FIG. 1. As shown in FIG. 4, cylindrical base wall 28 has an interior side 28a associated with base compartment 30 and an exterior side 28b. Handle 24 is attached to exterior side 28b at a point opposing case base 40 (FIGS. 1 & 4). Handle 24 allows a user to conveniently, manually carry case 10 when case 10 is closed.

Figure 4:
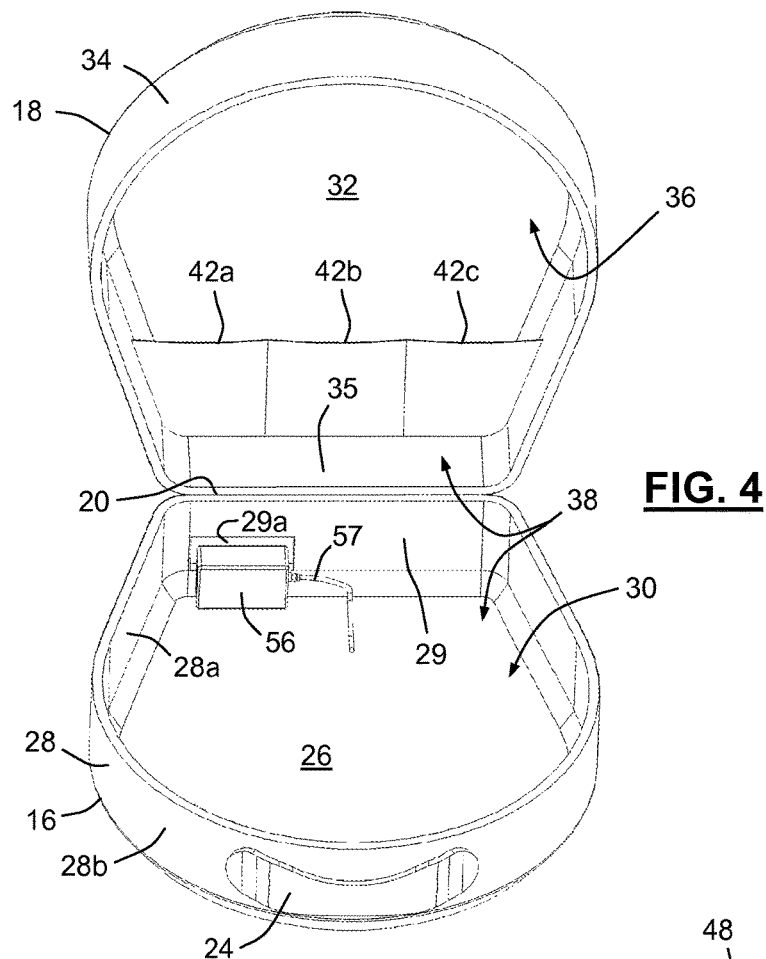
FIG. 4 is a perspective view of the electrical charging case of FIG. 1, shown in an open position with the charging station, headsets and transmitter removed and revealing an AC-to-DC power supply unit in a storage location.

As shown in FIGS. 2 and 4, three accessory pockets 42a, 42b and 42c are located inside lid compartment 36. The pockets are fashioned from a flexible fabric or plastic sheet material sewn, adhered or otherwise affixed to lid panel 32 and lid wall 34, as understood from FIGS. 2 & 4. The fabric or plastic material of pockets 42a, 42b and 42c may contain an elastic hem to create elastic-top pockets (i.e. elastic openings). Pockets 42a, 42b and 42c are used for storing various accessories associated with a group listening system, such as audio jack adaptors, cables, or even CDs or DVDs. An information graphic (or "info-graphic") may be printed on the inside of lid panel 32 (not shown) to provide instructions with diagrams for proper configuration and operation of the group listening system stored in case 10.

Figure 3:
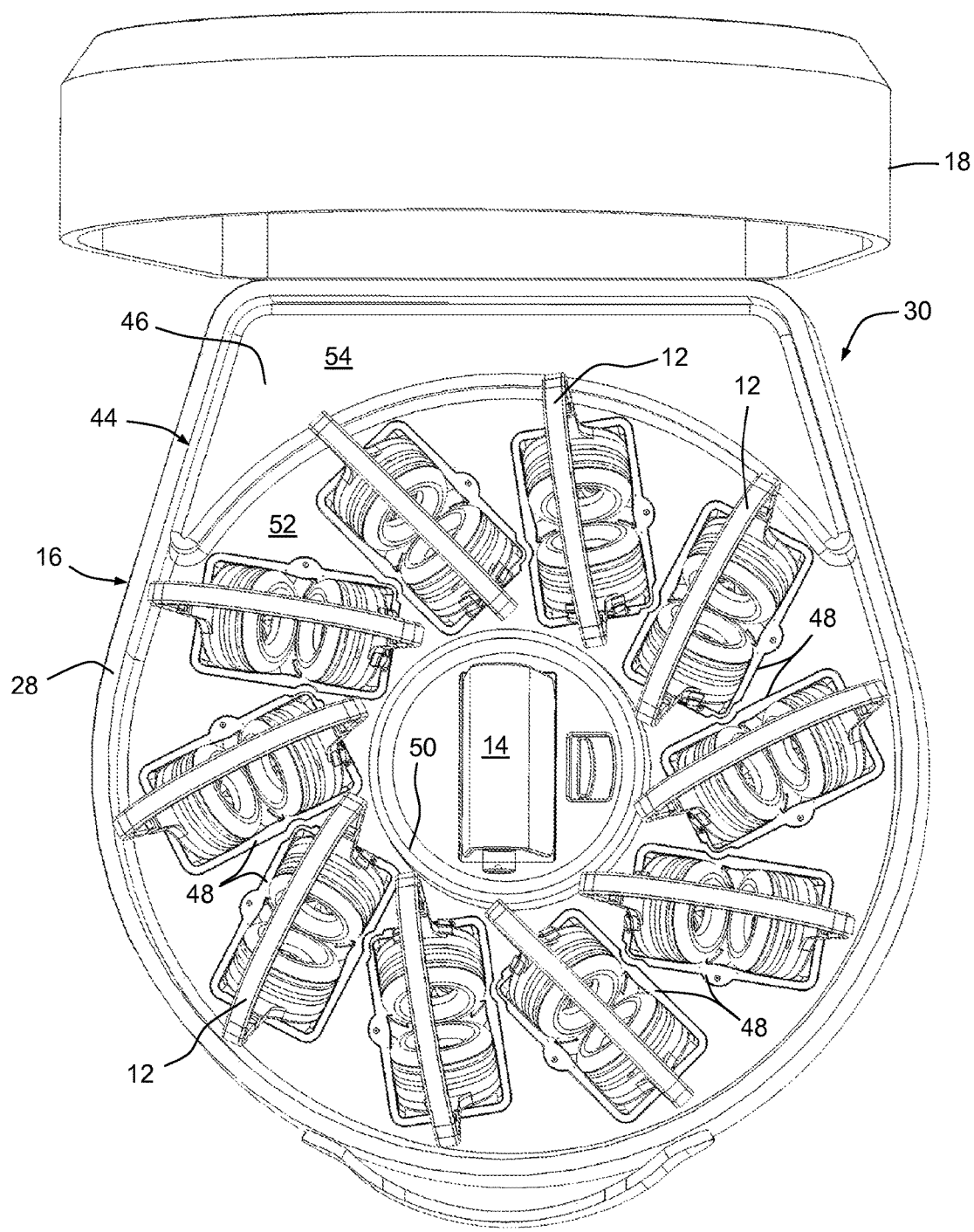
FIG. 3 is an enlarged overhead view of the open electrical charging case of FIG. 2, revealing a charging station, 10 wireless headsets, and one transmitter.
Figure 5:
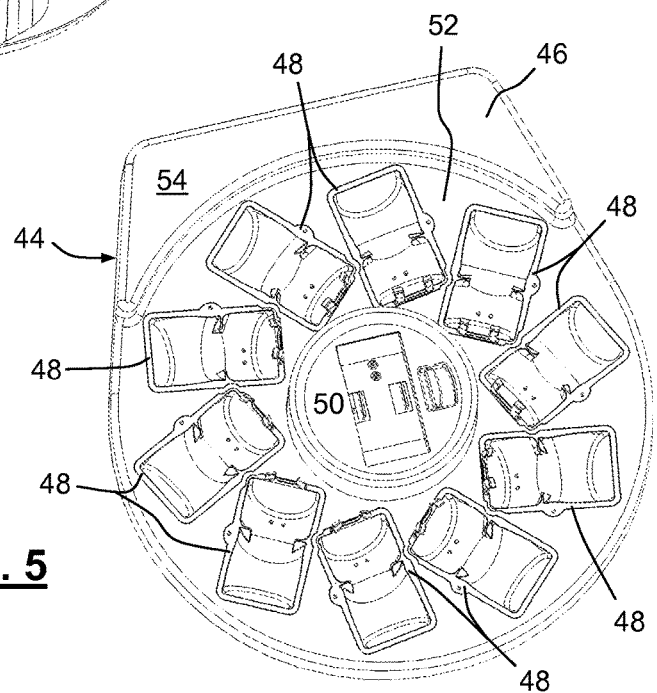
FIG. 5 is a top perspective view of the charging station removed from the case of FIG. 4, showing a foam base, 10 charging receptacles mounted in the foam base, and a charging tower extending through the center of the foam base.

Referring to FIGS. 2, 3 and 5, there is shown a charging station 44 mounted in base shell 16 and substantially occupying base compartment 30 of case 10. As shown in FIGS. 3 and 5, charging station 44 includes a base 46, ten earcup charging receptacles 48 (for headsets 12), and a charging tower 50 (for transmitter 14). Charging station 44 also includes charge distribution circuitry mounted under base 46 (see FIG. 15). As understood from FIGS. 3 and 5, base 46, receptacles 48 and tower 50 may be all individual parts or they may be integrally formed in one unitary structure (e.g., molded as one part). In another variation, base 46 and receptacles 48 may be integrally formed in one unitary structure and tower 50 would remain a separate part. It is preferred, however, that base 46, receptacles 48 and tower 50 be realized as separate elements. Base 46 is preferably a foam base made from, e.g., ethylene-vinyl acetate (EVA). Charging receptacles 48 and charging tower 50 may be made from a plastic material, e.g., polycarbonate/acrylonitrile butadiene styrene (PC/ABS). However, receptacles 48 may be made of foam and integrally formed with a foam base 46 in a unitary structure. Base 46 has a circular tray portion 52 and a hollow storage annex portion 54 (FIGS. 3 & 5). As shown in FIGS. 3 & 5, receptacles 48 are disposed in a close circular pattern about a center area. The center area is substantially occupied by charging tower 50. As will be discussed further below, receptacles 48 are configured to receive and support headsets 12. As shown in FIG. 3, headsets 12 are correspondingly arranged in a close circular pattern about the center area. The elongated or major dimension of each receptacle 48 is oriented radially in the circular pattern. The terms "radially" or "radial" are to be construed, for the purposes of this disclosure and the claims, to include an orientation along the radius of a circular space and reasonable variations from along the radius. For example, these terms include a substantially radial orientation or even a generally radial orientation as shown in FIGS. 3 & 5. In FIG. 3, headsets 12 are correspondingly supported in an orientation where an elongated dimension of each headset is positioned radially in the circular pattern. The close circular pattern of either charging receptacles 48 or headsets 12 is in close concentric relationship with cylindrical base wall 28 (FIG. 3) or the combined cylindrical wall of case 10. Charging tower 50 is in close concentric relationship with the circular pattern of either charging receptacles 48 or headsets 12 (FIGS. 3 & 5). As best shown in FIG. 3, headsets 12 and transmitter 14 are organized in a "spoke and hub" arrangement, where headsets 12 are the "spokes" and transmitter 14 is the "hub".

Referring to FIG. 5, charging station 44 is shown removed from the carrying case portion of case 10 to better illustrate the structure of station 44. Charging station 44 is configured and dimensioned to fit snugly in base shell 16. Preferably, station 44 is permanently mounted in shell 16 by way of an adhesive or other suitable attachment means. However, the present invention is not limited to a permanently mounted charging station. In a variation of the embodiment, charging station 44 becomes a removable functional part, which can charge headsets 12 and transmitter 14 outside the case. For example, charging station 44 can be removed and placed on a conference room table to charge headsets 12 and transmitter 14.

As shown in FIG. 4, an AC-to-DC power supply unit 56 is stored in base compartment 30 (and would be located under annex 54 of base 46). Flat segment 29 of base wall 28 contains a rectangular opening 29a having dimensions that allow easy insertion or removal of power supply unit 56 from its stored location in compartment 30. Power supply unit 56 may be retained in its stored location by resilient metal or plastic retainer clips (not shown). A closure (e.g., a latched or zippered flap) may be installed over opening 29a. Power supply unit 56 has an AC power cord (not shown) removably connected to the unit, for plugging into a standard wall outlet. Unit 56 also has a DC power cord 57 (FIG. 4) permanently connected to the unit, which has a standard DC barrel connector plug to be inserted into a complementary DC jack associated with the charge distribution circuitry of charging station 44 (further details below). In this embodiment, power supply unit 56 (i.e., the black box or "brick") is removed from case 10 during the charging operation. DC power cord 57 is long enough to allow for such removal and remain connected to the charging circuitry. A cable clamp or other strain relief mechanism (not shown) may be employed to prevent cord 57 from disconnecting from the charging circuitry, in the event that power supply unit 56 is dropped or pulled. Power supply unit 56 may be a Model ETSA060300UDC-P5P-SZ AC-DC Desktop Adapter, with an output voltage of 6 Volts, maximum output current of 3 Amps, and a maximum output power of 18 Watts, manufactured by CUI Inc., Tualatin, Oreg.

Figure 6:
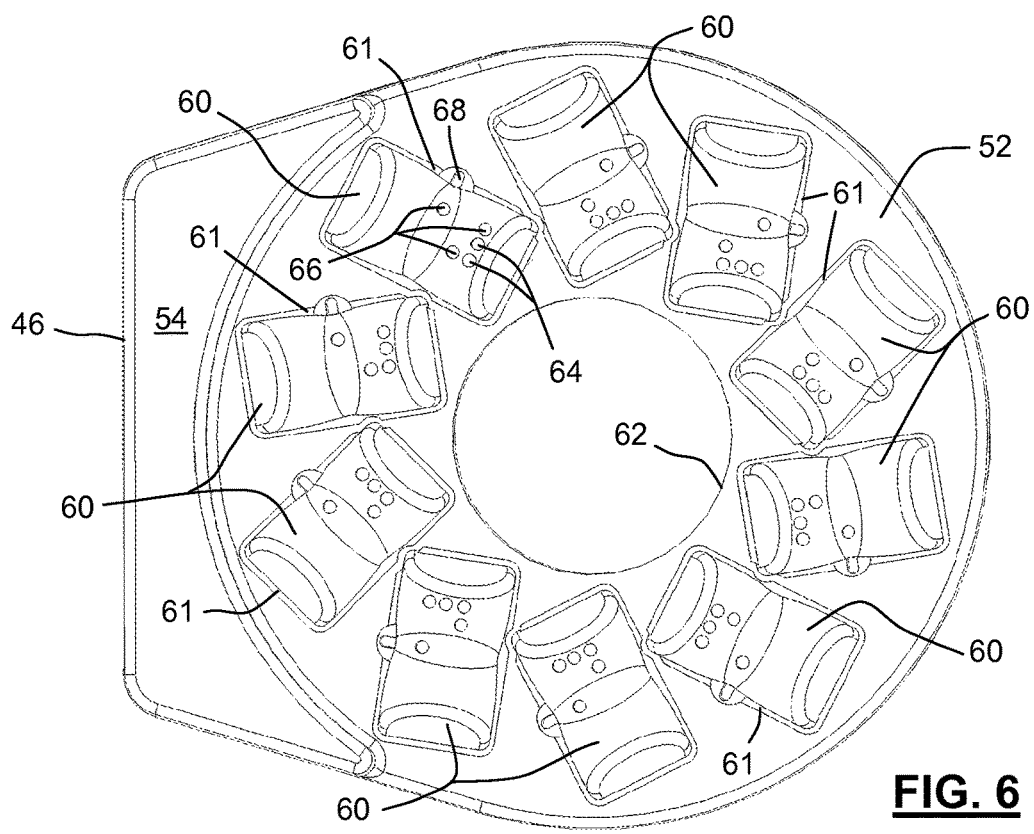
FIG. 6 is a top plan view of the foam base alone, without the charging receptacles and the charging tower.
Figure 7:
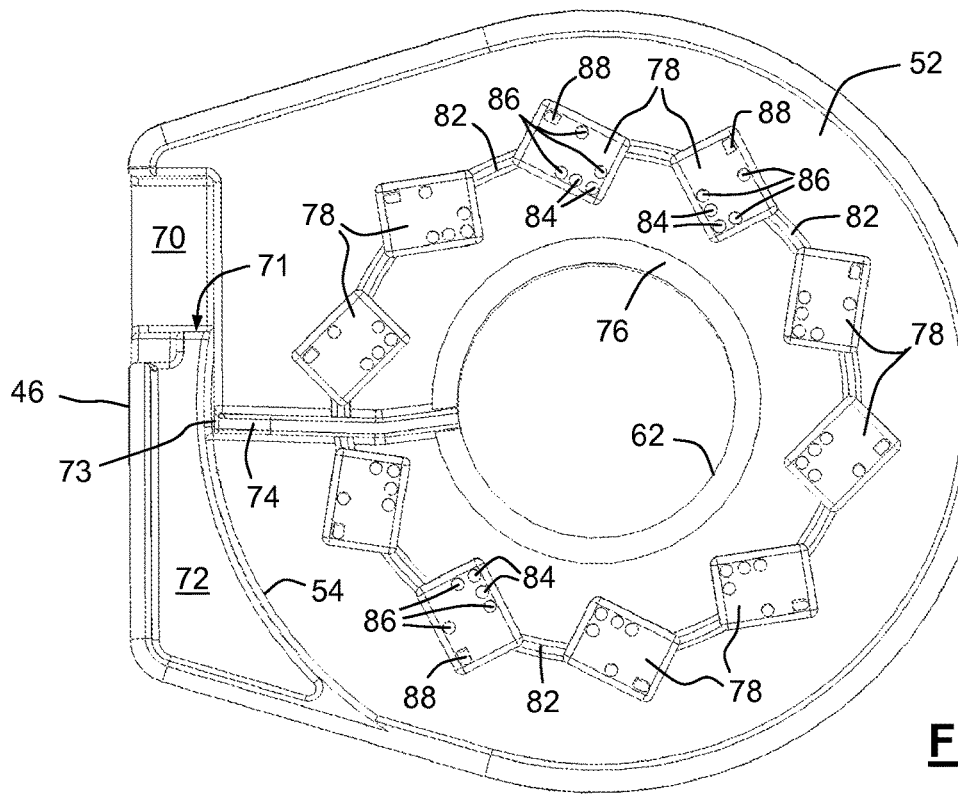
FIG. 7 is a bottom plan view of the foam base alone, without charging receptacles, charging tower, printed circuit boards, and wiring.
Figures 8A, 8B, 8C:
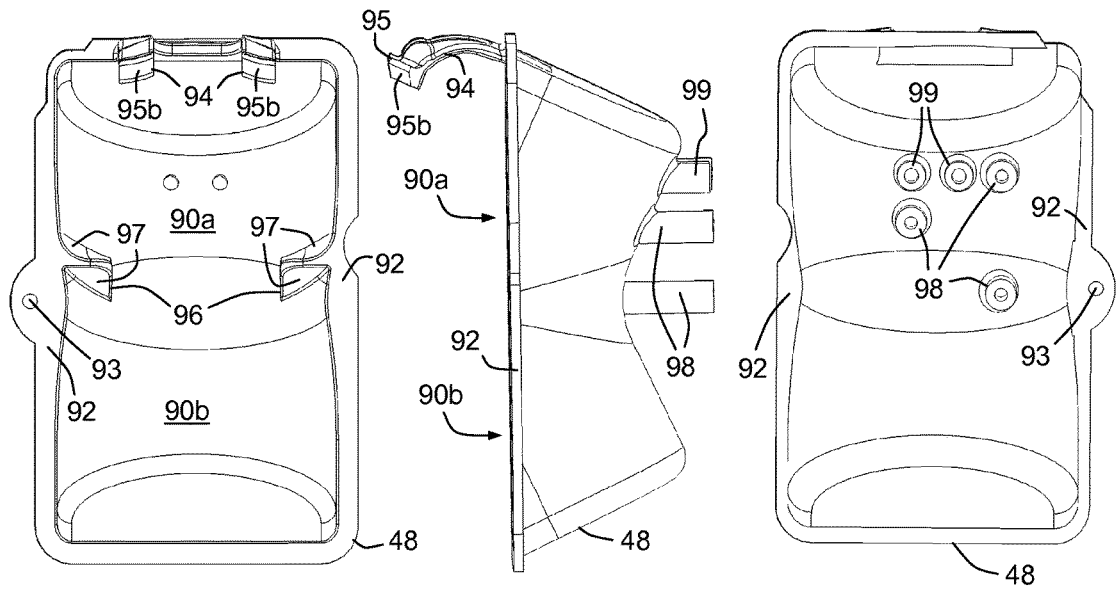
FIGS. 8A-8C are top, side and bottom views of one of the charging receptacles of FIG. 5.
Figures 9A, 9B:
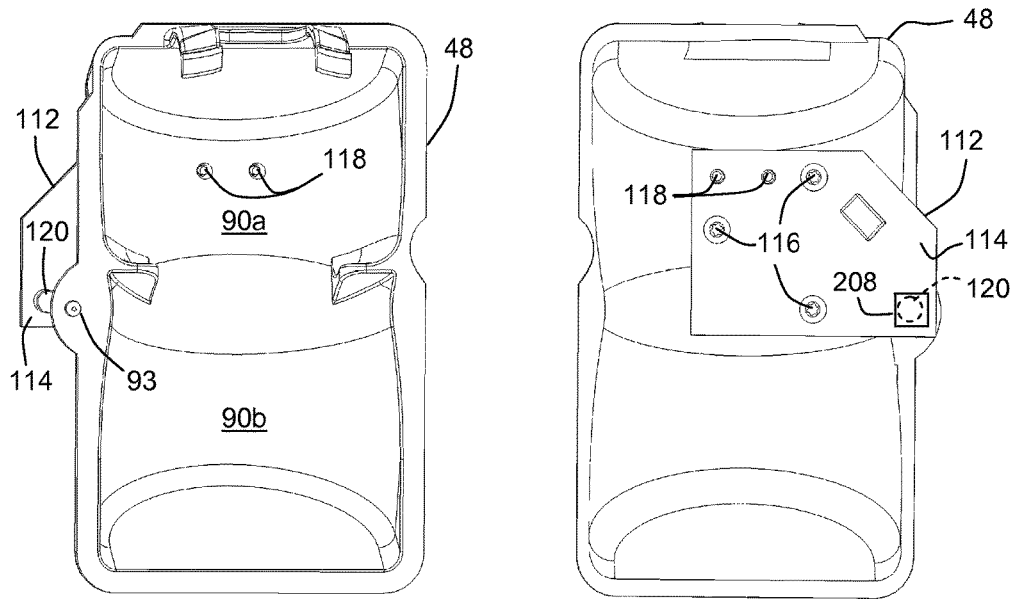
FIGS. 9A-9B are top and bottom plan views of one of the charging receptacles of FIG. 5, shown with a printed circuit board assembly mounted to its bottom.
Figure 10A:
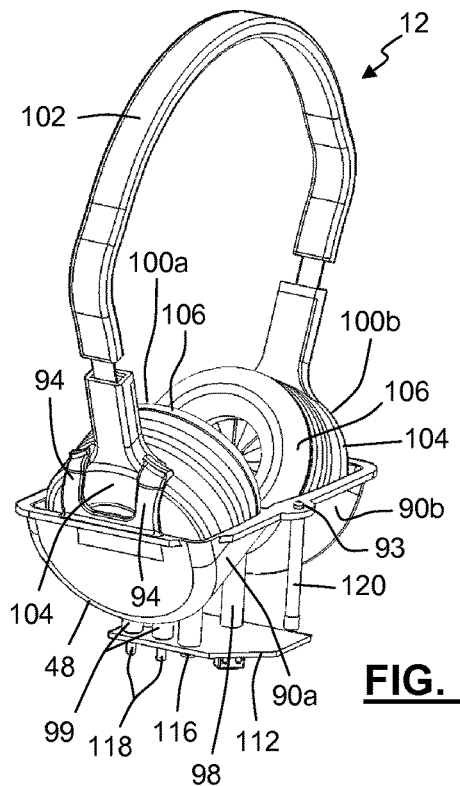
FIGS. 10A-10C are perspective views of one of the wireless headsets supported in a position for charging its battery, where
Figure 10B:
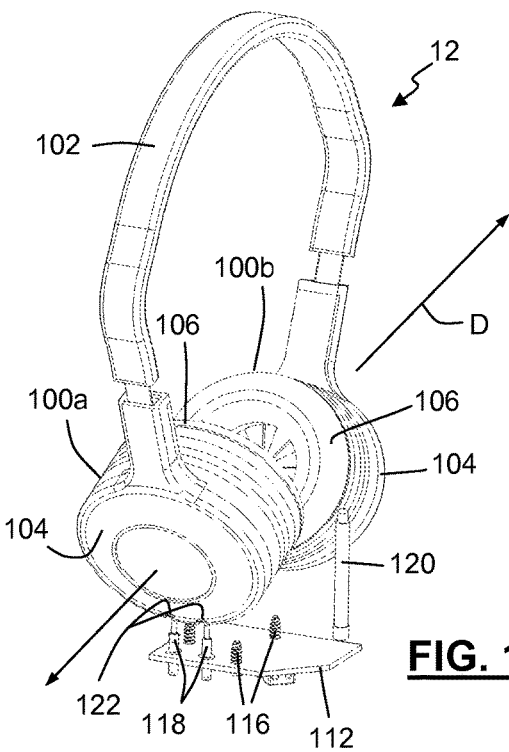

Turning to FIGS. 6 and 7, the embodiment where base 46, receptacles 48 and tower 50 are separate elements will now be described. In FIGS. 6 and 7, top and bottom plan views of base 46 are shown without charging receptacles 48, charging tower 50, or the charging circuitry. Heretofore, base 46 is depicted as a base made of EVA foam. As mentioned above, base 46 includes tray portion 52 and storage annex portion 54. In FIG. 6, a top side of tray portion 52 contains ten receptacle cavities 60 and a center hole 62. Cavities 60 are arranged in a circular pattern and each are configured specifically to receive and support a charging receptacle 48. Each cavity 60 has a perimeter recess 61 for seating a corresponding flange 92 around receptacle 48 (FIG. 8A). Hole 62 passes completely through base 46 and is in registration with the center area defined by the circular pattern of receptacles 48 or headsets 12 (FIG. 3). As shown in FIG. 6, each cavity 60 includes two pogo-pin boss holes 64, three screw boss holes 66, and a light pipe hole 68. Holes 64 permit two smoothbore bosses 99, integrally molded on the bottom of receptacle 48 (FIG. 8C), to extend down through cavity 60 (base 46) and reach a printed circuit board assembly (PCBA) 112 (FIG. 10A) underneath cavity 60. Smoothbore bosses 99 provide a conduit for two pogo-pins 118 (i.e., spring-loaded electrical contacts), which extend from PCBA 112 to the interior of receptacle 48 (FIGS. 9A, 10A & 10B). Holes 66 permit three threaded bosses 98, integrally molded on the bottom of receptacle 48 (FIG. 8C), to extend down through cavity 60 (base 46) and reach PCBA 112 (FIG. 10A) underneath cavity 60. Threaded bosses 98 receive mounting screws 116 from PCBA 112 (FIGS. 8C, 9B, 10A & 10B) for attaching PCBA 112 to receptacle 48 and clamping receptacle 48 into cavity 60. Hole 68 permits an LED light pipe assembly 120 to extend up from PCBA 112, through cavity 60 (base 46), and through a hole in flange 92 of receptacle 48. In an alternative arrangement, pogo-pin boss holes 64, screw boss holes 66, and light pipe hole 68, are replaced with one relatively large, generally L-shaped, through hole encompassing the locations of holes 64, 66 and 68, in each cavity 60. The large through hole is positioned, configured and dimensioned in cavity 60 to allow the smoothbore bosses 99, threaded bosses 98, and light pipe 120 to pass through cavity 60, between receptacle 48 and PCBA 112. This alternative arrangement ("alternative mold arrangement") may be easier to mold than the preferred arrangement shown in FIG. 6 using individual holes 64, 66 and 68 (hereinafter "alternative mold arrangement").

Figure 11A:
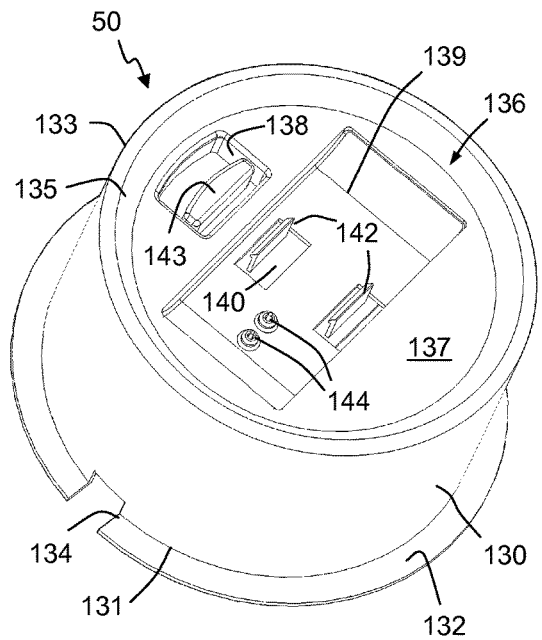
FIGS. 11A-11D are various views of the charging tower, where
Figure 15:
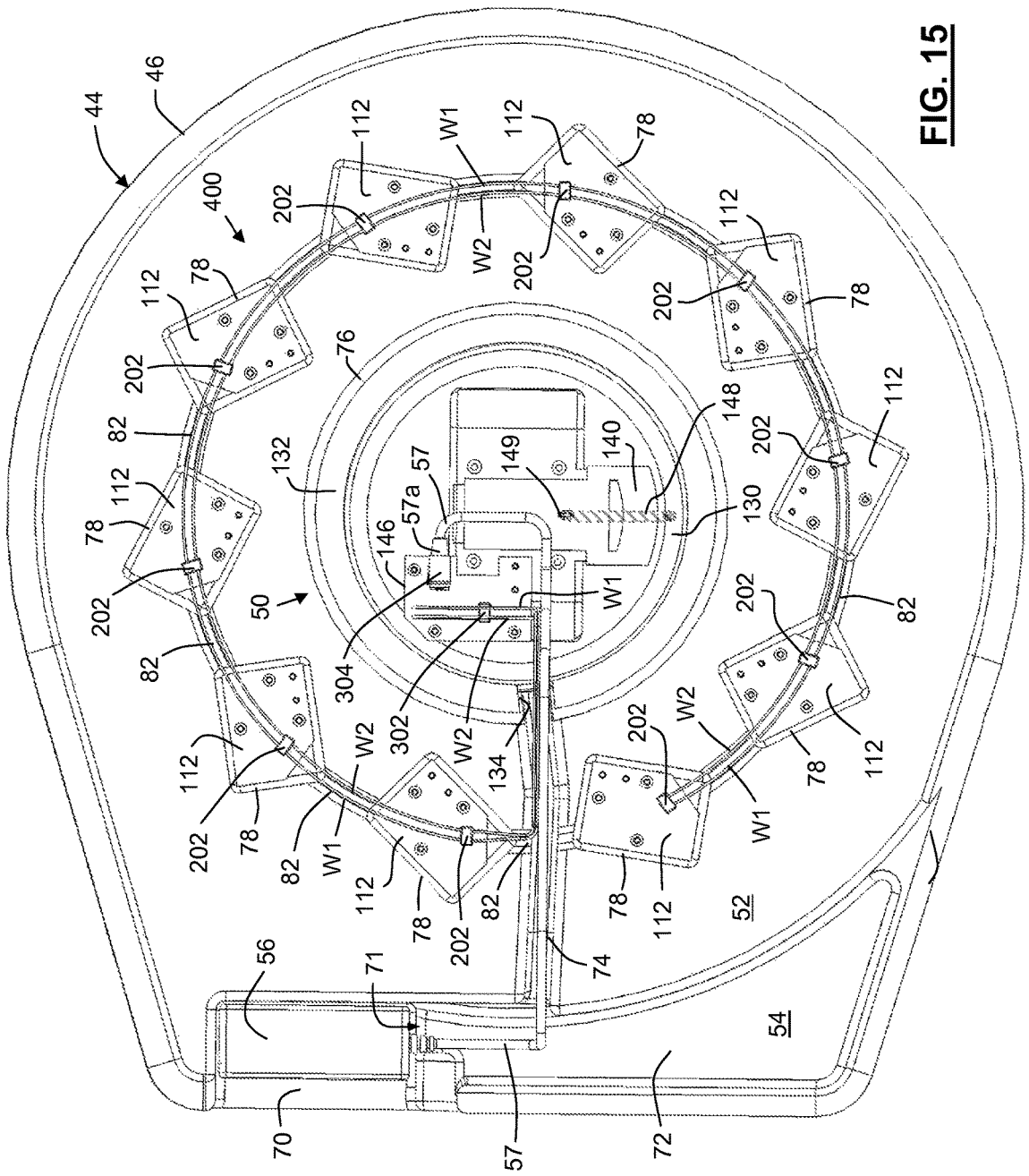
FIG. 15 is a bottom plan view of the charging station showing an overall view of a multi-board charge distribution circuit for the charging station.

FIG. 7 shows a bottom side of base 46. As shown in FIG. 7, a storage compartment 70 is contained within storage annex 54. Compartment 70 is sufficiently dimensioned to receive and store power supply unit 56. Compartment 70 contains an opening 71, which allows DC power cord 57 of unit 56 to pass through into an auxiliary chamber 72. Chamber 72 contains an opening 73, which joins an open cable race or channel 74. An annular recess 76 is molded around the edge of center hole 62, on the bottom side, for receiving a mounting flange 132 of charging tower 50 (FIG. 11A). Also on the bottom side of base 46, are ten rectangular printed circuit board recesses 78, each configured to receive and nest one of the ten PCBAs 112. Recesses 78 are arranged in a circular pattern and generally correspond to the locations of cavities 60. As shown in FIG. 7, wire races or channels 82 extend between recesses 78 to provide a path for a pair electric wires running from one board to another (FIG. 15). As shown in FIG. 7, each recess 78 contains a set of holes 84, 86 and 88, which are actually the opposing ends of holes 64, 66 and 68, respectively, of cavity 60 (FIG. 6). That is, holes 84 are for smoothbore bosses 99; holes 86 are for threaded bosses 98; and hole 88 is for the LED light pipe assembly. In the alternative mold arrangement, holes 84, 86 and 88 are replaced with the larger through hole described in the previous paragraph. Also, in the alternative mold arrangement, circuit board recesses 78 and wire channels 82 are replaced with one continuous annular recess in foam tray 52 for receiving and nesting the ten PCBAs 112. The annular recess also serves the same function as wire channels 82, i.e., to provide a path for electric wires running between PCBAs 112. In this alternative embodiment, cable channel 74 passes through the annular recess and reaches hole 62, in a similar manner as shown in FIG. 7.

Turning now to FIGS. 8A-8C, enlarged depictions of charging receptacle 48 is shown in top, side and bottom views, respectively. Receptacle 48 contains a pair of earcups 90a and 90b, a perimeter flange 92, a pair of headphone retainer fingers 94, and a pair of headphone partitions 96. As best shown in FIG. 10B, headset 12 includes a pair of headphone units 100a and 100b connected together, in opposing relationship along a diametric axis D, by a headband 102. Each headphone unit 100a, 100b includes a dome 104 and an earpad 106. Earcups 90a and 90b are configured and dimensioned to closely receive and support headphone units 100a and 100b, respectively (see FIG. 10A). Perimeter flange 92 (FIG. 8A) is configured to mate or seat flush in perimeter recess 61 of foam base 46 (FIG. 6). Flange 92 contains a hole 93 for receiving the lens portion of a LED light pipe assembly 120 (see FIG. 10A). Headphone retainer fingers 94 are integrally molded with flange 92 and extend out from flange 92 and bend slightly over earcup 90a (FIG. 8B). Fingers 94 are semi-flexible, but resilient. Each finger 94 has a fingertip 95 with a cam surface 95a (FIGS. 8A & 8B). Headphone unit 100a is inserted into earcup 90a at an angle to allow it to pass under fingers 94 or brush against cam surfaces 95a to nudge fingers 94 slightly out of the way during insertion. If nudged, fingers 94 spring back to their original position once headphone unit 100a is seated. As shown in FIG. 10A, fingertips 95 engage and hold headphone unit 100a, and this engage and hold function secures the entire headset 12 in receptacle 48. Partitions 96 assist in securing headset 12 in receptacle 48. Partitions 96 provide opposing support surfaces for headphone units 100a, 100b, on the earpad side of the units. As shown in FIG. 8A, partitions 96 include concave shoulders or seats 97 that receive the earpads 106 of headphone units 100a, 100b (FIG. 10A), to assist in holding units 100a, 100b in place. Partitions 96 may be (and in some applications are preferably) entirely dispensed with as part of the structure of receptacles 48. For many designs, headphone units 100a, 100b are secured in receptacle 48 without partitions 96, the retaining fingers 94 adequately serving this function.

Referring to FIGS. 8B and 8C, receptacle 48 includes three threaded bosses 98 and two smoothbore bosses 99. Bosses 98 and 99 are integrally molded with the bottom of receptacle 48. Threaded bosses 98 are to receive pan head screws for attaching an associated PCBA 112 to receptacle 48 (with foam base 46 in between). Smoothbore bosses 99 serve as conduits for pogo-pins 118 to pass there-through (see FIGS. 9A & 10A).

Referring now to FIGS. 9A and 9B, top and bottom plan views of receptacle 48 are shown equipped with a printed circuit board assembly (PCBA) 112. As indicated above, a PCBA is associated with each receptacle 48 in charging station 44. PCBA 112 includes a printed circuit board (PCB) 114. PCBA 112 is part of a multi-board charge distribution circuit associated with charging station 44. FIG. 9B shows the bottom side of PCBA 112 mounted to receptacle 48. PCBA 112 is mounted to receptacle 48 using three Plastite® torx pan head screws 116 extending through holes in PCB 114 and threaded into bosses 98 (FIGS. 9B & 8C). On the bottom side of PCBA 112 is a receptacle charging circuit (further described below), which is connected to a pair of pogo-pins 118. Pogo-pins 118 are thru-hole-mounted to PCB 114. Pogo-pins 118 extend up from a top side of PCBA 112 (into the paper in FIG. 9B) and up through smooth bosses 99 (FIG. 9A). As shown in FIG. 9A, pogo-pins 118 (i.e., the spring-loaded plunger contact portions of the pogo-pins) project up into earcup 90a sufficiently enough to make physical and electrical contact with corresponding metal contacts contained on headphone unit 100a (see FIGS. 10B & 10C). Pogo-pins 118 are also known as spring contact probes and are commercially available. One commercial example of pogo-pins suitable for this embodiment is Part No. 101247 Probe, manufactured by Interconnect Devices, Inc., Kansas City, Kans.

PCBA 112 also contains an LED light pipe assembly 120, including a light pipe and a domed lens. Assembly 120 is coupled to a tricolor or bicolor LED chip 208 (FIGS. 9B & 13A) surface mounted, surface mounted upside down, reverse mounted, or thru-hole mounted to board 114. As shown in FIG. 9A, the domed lens of light pipe assembly 120 extends through hole 93 in receptacle 48. Assembly 120 provides a visual indication of the charge status of the headset being charged in receptacle 48. For example, if a tricolor LED is used, the LED will emit a yellow light when the headset is being charged, a green light when the headset is fully charged, and a red light if the headset will not charge after expiration of a predetermined charging period ("bad" battery). A suitable commercially available light pipe is a Dialight Optopipe® Part No. 515-1194-0100DF vertical LED light pipe, manufactured by Dialight Corp., Farmingdale, N.J.

Figure 10C:
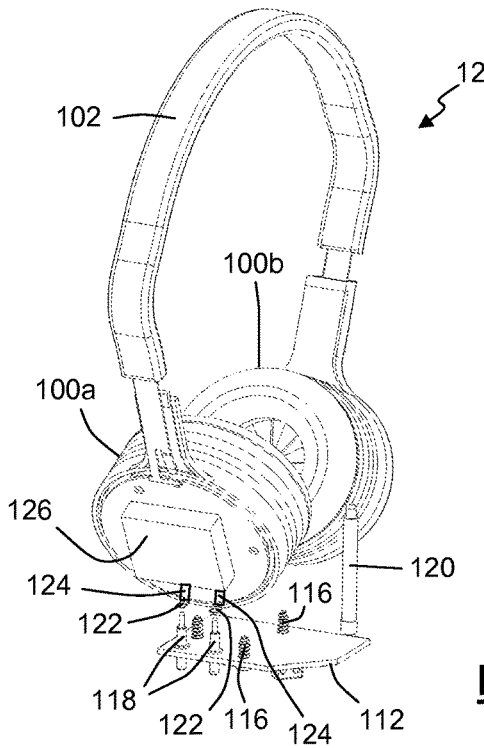

Referring now to FIGS. 10A-10C, headset 12 is shown in a charging position. In FIG. 10A, headset 12 is seated in receptacle 48 and secured in the charging position by headphone retainer fingers 94. PCBA 112 is shown mounted to receptacle 48, with foam base 46 removed for clarity. Foam base 46 is actually situated between PCBA 112 and receptacle 48, as understood from the discussion involving FIGS. 6 and 7. In FIG. 10A, you can see threaded bosses 98 mounted against PCBA 112 by pan head screws 116 (see also FIG. 10B). Smoothbore bosses 99 are also up against PCBA 112 and help support pogo-pins 118. Lastly, LED light pipe assembly 120 is clearly shown in FIG. 10A mounted to PCBA 112, projecting up from PCBA 112, and terminating through hole 93 in flange 92 of receptacle 48. As shown in FIG. 10A, the domed lens of assembly 120 extends through hole 93 so it is plainly visible for charge status indication. The dome lens produces diffused light for a more uniform and omni-directional emission of light (to improve visibility).

FIG. 10B is the same view as FIG. 10A, except receptacle 48 has been removed to show the point-to-point physical and electrical contact between pogo-pins 118 and headset 12. As shown in FIG. 10B, headphone unit 100a contains a pair of metal electrical contacts 122 in registration and in contact with pogo-pins 118. The charging of headset 12 is accomplished in this way. Charging current from the receptacle charging circuit on PCBA 112 is transferred to headset 12 by pogo-pins 118, which are, again, in contact with contacts 122. Note also pan head screws 116 in FIG. 10B, which are exposed due to the removal of receptacle 48. FIG. 10B also helps define a frame of reference for headset 12, which is based on a diametric axis D. As mentioned before, headphone units 100a, 100b are connected together in opposing relationship along diametric axis D by headband 102. Receptacle 48 has an elongated or major dimension (FIGS. 9A & 10A), which is aligned with diametric axis D when headset 12 is seated in receptacle 48. Referring back for a moment to FIG. 3, receptacles 48 are oriented in the circular pattern such that, when headsets 12 are supported in the receptacles, headsets 12 are in an orientation where their diametric axes D are positioned radially in the circular pattern.

FIG. 10C is the same view as FIG. 10B, except dome 104 of headphone unit 100a has been removed. Dome 104 is removed to better show contacts 122 and reveal a charge receiving circuit 124 and a battery 126. As shown in FIG. 10C, contacts 122 are aligned with pogo-pins 118 to make physical and electrical contact. Charge receiving circuit 124 is represented in FIG. 10C as a pair of PCB conductive traces running from contacts 122 to positive and negative terminals (not shown) of battery 126. The traces are connected to contacts 122 and to the terminals of battery 126. The traces deliver charging current (transferred from pogo-pins 118 to contacts 122) to battery 126, and the charging current charges battery 126. Circuit 124 may be realized instead by wire leads or some other suitable well-known coupling circuit. Battery 126 serves as the electrical power source for wireless headset 12 (e.g., for a wireless RF receiver in headset 12). Battery 126 is preferably a single-cell lithium-ion (Li-Ion) or lithium polymer battery, typically used in wireless headsets or receivers, but may be any suitable battery or other charge-storage device.

It should be understood that present invention is not limited to the use of pogo-pins as a means for transferring electrical charging current to the headsets. For example, a 3.5 millimeter phone jack plug may replace the pogo pins and, in such case, the headsets would be equipped with a 3.5 millimeter phone jack for receiving the plug when the headsets are seated in the charging receptacles 48. Incidentally, if the headsets are equipped with a 3.5 mm phone jack, the jack may also function as an audio input or output. Another approach is to use induction coils, which do not require physical contact between two sets of contacts to transfer the charging current to the headset. The induction coil approach utilizes a primary coil in place of pogo-pins 118 and a secondary coil in place of headphone contacts 122. One example of such a mechanism is disclosed in U.S. Pat. No. 4,229,829 (FIG. 6; col. 6, line 64 to col. 7, line 17), which is incorporated herein by reference.

Figure 11B:
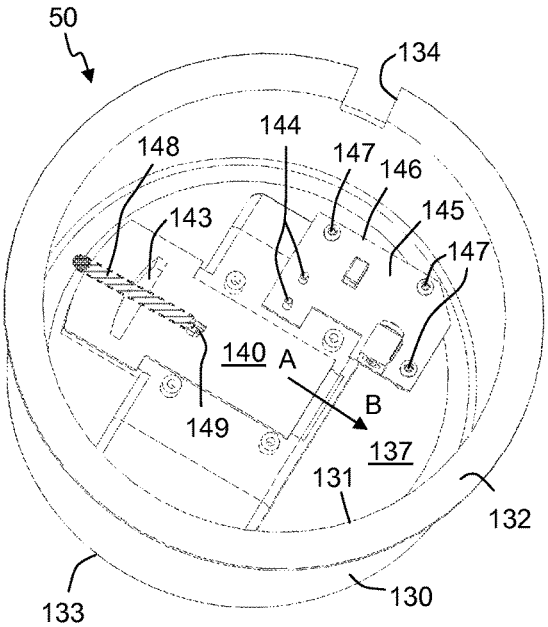
Figure 11C:
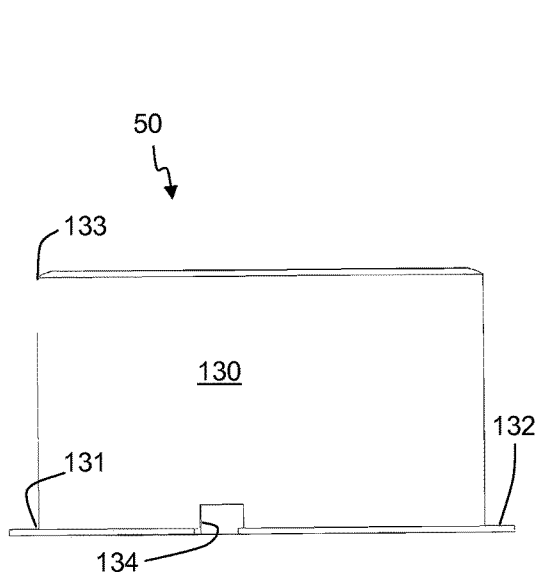

Referring now to FIGS. 11A-11D, various views of charging tower 50 are shown. Charging tower 50 includes: a cylindrical tower portion 130, having a base end 131 and a top end 133; a mounting flange 132 extending almost all around base end 131; a cutout 134 extending into tower portion 130 and braking flange 132; a tapered rim 135 formed at top end 133; a top side 137; a charging bay 136 contained in top side 137; and slide bar opening 138. The purpose of flange 132 is for mounting charging tower 50 to foam base 46. Flange 132 is dimensioned to mate with or seat flush in annular recess 76 of base 46 (FIG. 7). An adhesive is preferably used to effect an attachment of flange 132 to base 46. The purpose of cutout 134 is to provide a way for DC power cord 57 (FIG. 4) to enter charging tower 50 and reach a PCBA 146 therein (FIG. 11B). Tower portion 130 extends up through foam base 46 (through opening 62) and projects out from base 46 a reasonable degree. Tower portion 130 establishes a height for charging bay 136. For example, the height of tower portion 130 may be approximately twice the height of the top (defined by flanges 92) of charging receptacles 48. The height of tower portion 130 should be reasonably limited in order to maintain an overall compact design (see FIGS. 2 & 3). Charging bay 136 is configured and dimensioned to receive and support transmitter 14 (see FIG. 12A).

Figure 11D:
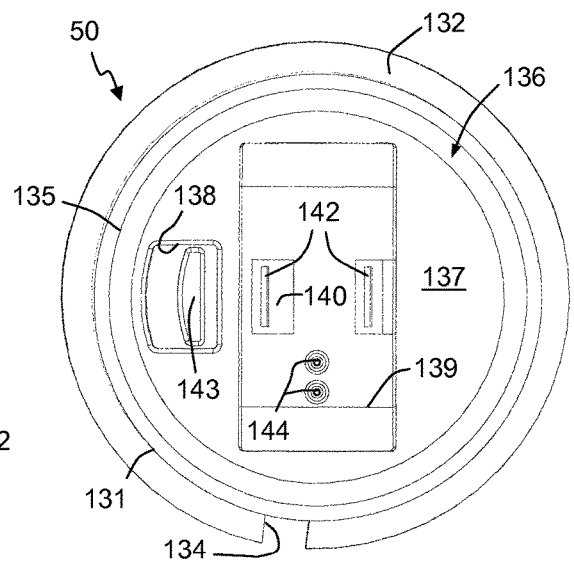
Figure 12A:
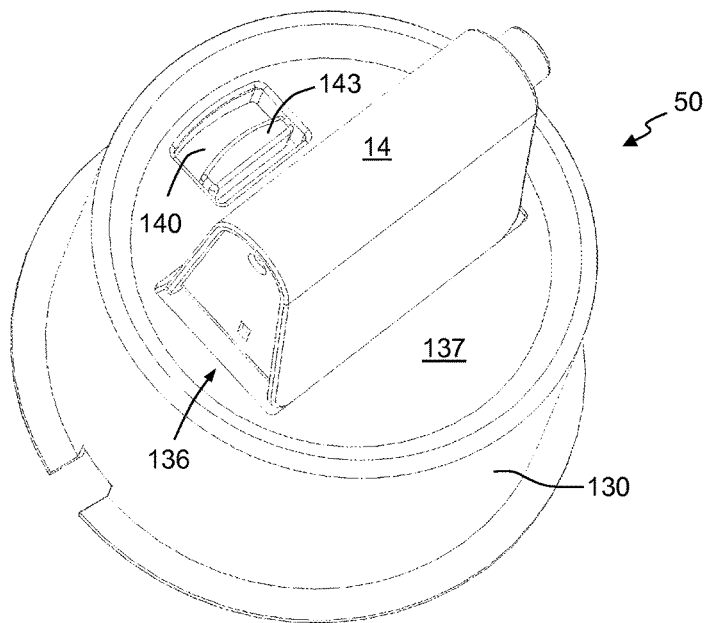
FIGS. 12A-12C are perspective views of the transmitter, where
Figure 12B:
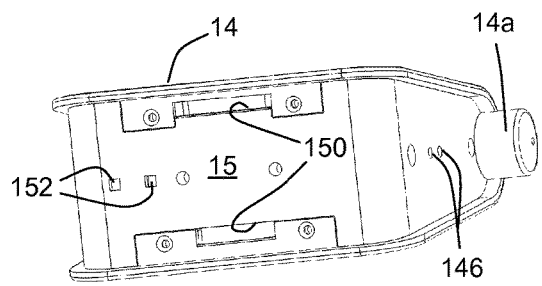
Figure 14A:
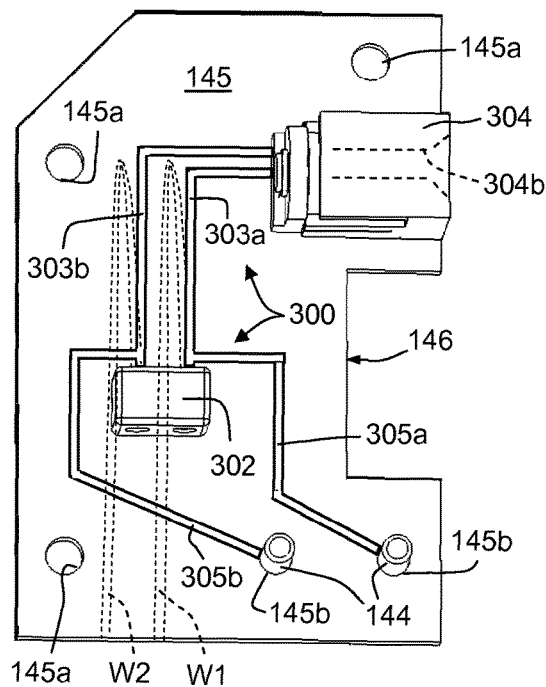
FIGS. 14A-14C are a series of diagrams concerning the PCBA of the charging tower, where
Figure 14B:
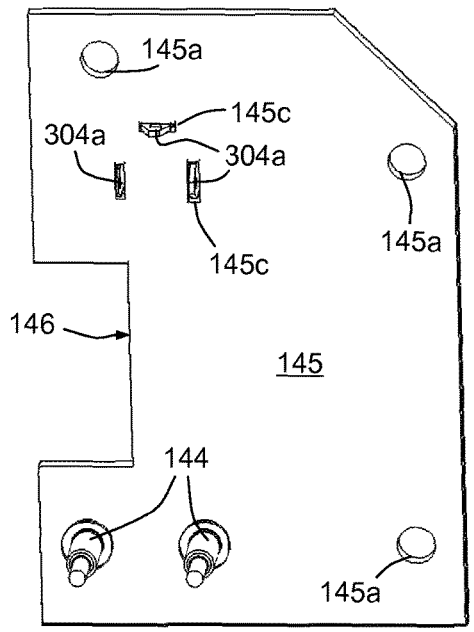
Figure 14C:
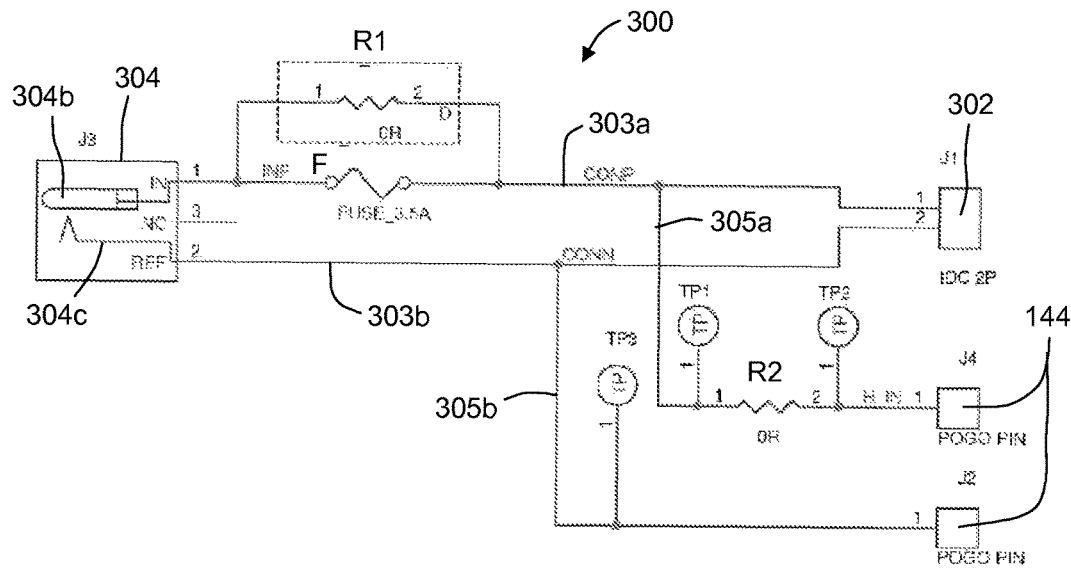

As shown in FIGS. 11A & 11D, charging bay 136 contains a recess 139 in top side 137, having a shape that is complementary to a bottom side 15 of transmitter 14 (FIGS. 12A & 12B). Charging bay 136 includes a slide bar 140 (best shown in FIG. 11B) having a pair of perpendicularly projecting latch hooks 142 and a slide-actuating handle 143. Charging bay 136 further includes a pair of pogo-pins 144 projecting upwards into recess 139. As shown in FIG. 11B, charging bay 136 is equipped with a power input PCBA 146 having a PCB 145 and a transmitter charging circuit mounted on PCB 145 (FIG. 14A-14C). PCBA 146 is mounted to the underside of top side 137 using three Plastite® torx pan head screws 147. Screws 147 extend through holes in PCB 145 and are threaded into threaded bosses extending down from top side 137 (not shown). PCBA 146 is part of the multi-board charge distribution circuit associated with charging station 44. PCB 145 has a top side (facing into the paper in FIG. 11B) and a bottom side (shown in FIG. 11B). Pogo-pins 144 are thru-hole or reverse mounted to PCB 145 and extend from the bottom side to the top side of PCB 145. Pogo-pins 144 continue through two short smoothbore bosses extending down from top side 137 (not shown), and then continue through top side 137 and into recess 139. In operation, charging current from the charging circuit is transferred to transmitter 14 by pogo-pins 144 (when transmitter 14 is situated in charging bay 136).

As indicated in FIG. 11B, slide bar 140 slides between a normally-latched position A to a spring-biased unlatch position B. In latched position A, transmitter 14 is latched to charging bay 136 (FIG. 12A), and in unlatched position B, transmitter 14 is released. As shown in FIG. 11B, a tension spring 148 is coupled, at one end, to a hook 149 projecting from the bottom of slide arm 140 and is coupled, at the other end, to another hook or fastener located on an inner surface of tower portion 130. As slide arm 140 is moved, using slide-actuating handle 143, from position A to position B, spring tension is applied to slide arm 140. This tension causes arm 140 to slide back to normal position A upon release of handle 143. Slide arm 140 is snapped onto a track (not shown) and is in sliding engagement with the track to achieve its motion between positions A and B. The latching mechanism shown in FIGS. 11A & 11B is but one example of how transmitter 14 may be latched in-place on tower 50. Other suitable latching mechanisms may be employed. For example, a reverse arrangement of what has been described may be adopted, where slide bar 140 is in a normally unlatched position and slides between that position and a latched position.

Figure 12C:
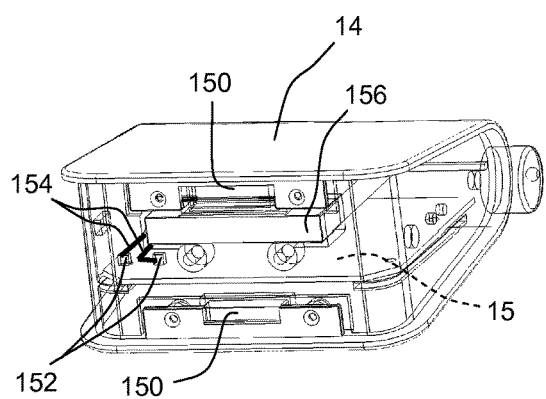

With reference to FIGS. 12A-12C, the electrical contact and mechanical attachment of transmitter 14 to charging tower 50 is further described. In FIG. 12A, transmitter 14 is shown latched to charging tower 50 in a charging position. Transmitter 14 is nestled in charging bay 136, while slide bar 140 is in latched position A. It is noted that transmitter 14 may operate (transmitting audio signals to headsets 12) while latched to tower 50. In FIG. 12B, transmitter 14 is positioned to show a bottom side 15. Transmitter 14 has an audio control knob 14a and power and audio indicator lights 14b. Two elongated latch hook slots 150 are contained in bottom side 15. Slots 150 are spaced apart and otherwise positioned to be put in registration with and engage latch hooks 142 (FIGS. 11A & 11D). There is a lip or edge in each slot 150 (not shown) that engages latch hooks 142. As seen in FIG. 11A, latch hooks 142 have cam or tapered surfaces that assist in the engagement of hooks 142 with slots 150. By pushing handle 143 toward transmitter 14 (in FIG. 12A), hooks 142 are moved slightly latterly to disengage from slots 150 and release transmitter 14. As shown in FIG. 12B, bottom side 15 also contains a pair of metal charging contacts 152, which align with pogo-pins 144 (FIG. 11A) when transmitter 14 is secured in charging bay 136.

Referring to FIG. 12C, bottom side 15 has been made transparent to show a charge receiving circuit 154 and a battery 156 inside transmitter 14. Circuit 154 is represented in FIG. 12C as a pair of wire leads. The wire leads are connected to contacts 152, respectively, and to positive and negative terminals (not shown), respectively, of battery 156. Wire leads 154 deliver charging current (transferred from pogo-pins 144 to contacts 152) to battery 156, and the charging current charges battery 156. Instead of wire leads, circuit 154 may be realized by PCB conductive traces or by some other suitable well-known coupling circuit. Battery 156 serves as the electrical power source for transmitter 14. Battery 156 is preferably a Li-Ion battery, typically used in cordless transmitters, but may be any suitable battery or other charge-storage device. The present invention is not limited to the use of pogo-pins as a means for transferring charging current to the transmitter. An alternative approach to pogo-pins and metal contacts is the use of an induction charging mechanism, using induction coils, as discussed above with respect to headsets 12.

In another exemplary embodiment, transmitter 14 is permanently attached to tower 50 (e.g., at the top of tower 50—see FIG. 12A) or a transmitter is installed inside tower 50. In either case, the transmitter is powered (for transmission operation) by an electrical connection to power supply unit 56. This embodiment can be best understood by referring to FIG. 12A. In this embodiment, tower 50 does not necessarily function as a charging unit. When transmitter 14 is installed inside tower 50, tower 50 is equipped with an input audio jack installed in the cylindrical wall of tower portion 130 or in top side 137 of tower 50. The audio jack is connected to the transmitter by a cable, circuit board or other suitable connection scheme. In another exemplary embodiment, as can be understood by referring to FIG. 12A, a speaker is housed inside tower 50. In this embodiment, the speaker faces out through top side 137 or out through the cylindrical wall of tower portion 130, and a speaker grill is installed in top side 137 or in tower portion 130 to protect the speaker. An input audio jack is also installed in tower 50 and is connected to the speaker to supply audio signals to the speaker.

Figure 13A:
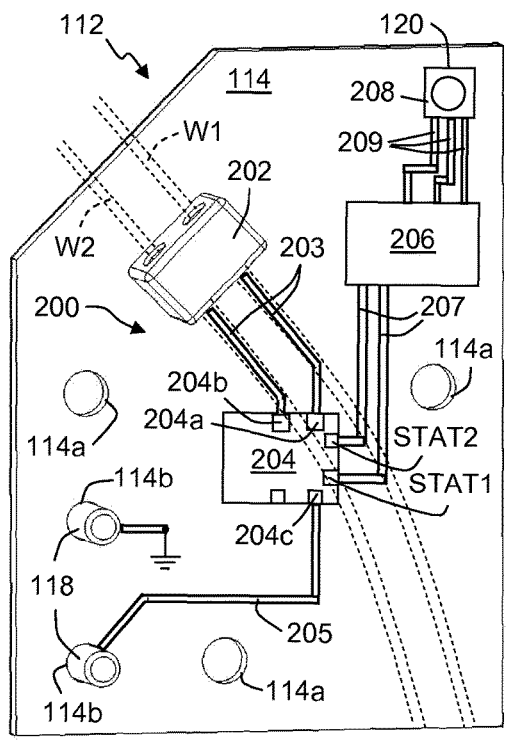
FIGS. 13A-13C are a series of diagrams concerning the printed circuit board assembly (PCBA) for each of the charging receptacles, where
Figure 13B:
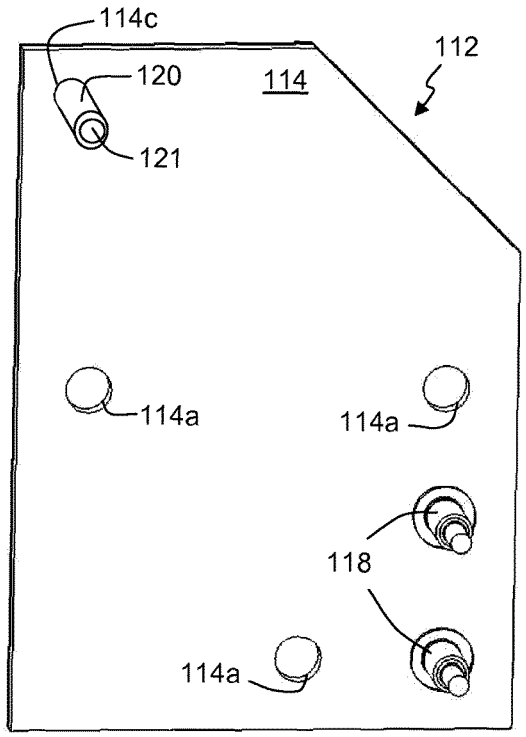
Figure 13C:
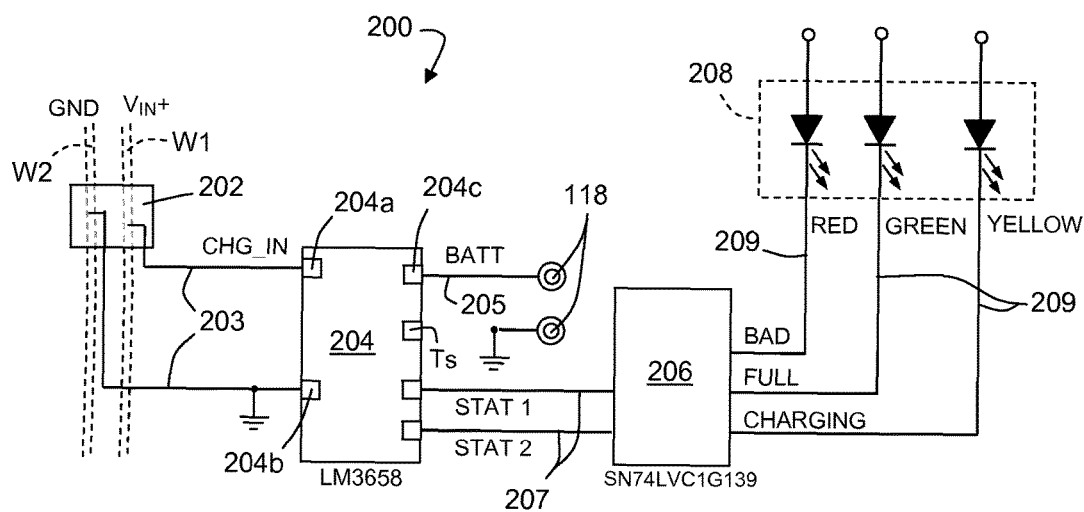

Turning now to FIGS. 13A & 13B, bottom and top views of PCBA 112 are shown, respectively. PCB 114 contains three mounting holes 114a for pan head screws 116, two thru-holes 114*b* for pogo-pins 118, and one thru-hole 114*c* for LED light pipe assembly 120. PCBA 112 includes a receptacle charging circuit 200 mounted on PCB 114 (FIG. 13A). Circuit 200 includes a 2-wire insulation displacement connector 202, a battery charger integrated circuit (IC) 204, a 2-to-4 line decoder 206, and a tricolor LED chip 208 (FIGS. 13A & 13C). Also refer to FIG. 13C in connection with charging circuit 200. There are ten PCBA's 112 (each including a charging circuit 200), one for each of the ten charging receptacles 48. The ten PCBA's 112 form part of a multi-board charge distribution circuit for charging station 44 (FIG. 15). Again referring to circuit 200, connector 202 is a 2-position, insulation displacement (IDC) connector designed for quick, tool-free connection (or tapping) of insulated wires to a printed circuit board ("wire-to-board connection"). Connector 202 provides a robust, stable electrical and mechanical power connection to PCBA 112. As shown in broken lines in FIGS. 13A & 13C, a pair of insulated bell wires W1 and W2 are fed thru connector 202. The insulation on wires W1 & W2 is pierced inside connector 202 as connector 202 is pushed from an extended first position to a retracted second position. Alternatively, a segment of insulation can be removed from each wire before insertion through connector 202. In the second position of connector 202, an electrical connection is established between wires W1, W2 and a pair of leads or contacts (not shown), respectively, of connector 202 (at its bottom). The leads or contacts are connected to etched copper traces 203 to complete the wire-to-board connection. A suitable commercially available insulation displacement connector is a Part No. 009176002732106. CONN IDC, 2 POS, 24 AWG, THRUCAP, manufactured by AVX Corporation, Greenville, S.C.

Wire W1 delivers the DC charging current at voltage Vin+ to PCBA 112, and wire W2 establishes a common ground or return for PCBA 112 (FIG. 13C). Traces 203 connect to two pins 204*a*, 204*b* of battery charger IC 204. The voltage Vin+ is applied to CHG_IN pin 204*a* and a common ground reference is established for IC 204 at pin 204*b*. IC 204 generates a regulated DC output voltage of 4.2 volts at a BATT output pin 204*c*. BATT output pin 204*c* is connected to one of the pogo-pins 118 via an etched copper trace 205. The pogo-pin 118 connected to pin 204*c* is the one that will make contact with the positive terminal of headset battery 126, via contact 122 and charge receiving circuit 124 (see FIG. 10C). The latter is referred to now as "positive pogo-pin 118." The connection between pin 204*c* and positive pogo-pin 118 is simplified for clarity, but preferably may include a 1 µF shunt capacitor, a 400 W transient voltage suppressor in parallel with the shunt capacitor, and a series resistor connected between the parallel circuit of shunt capacitor and voltage suppressor and the positive pogo-pin 118. The other pogo-pin 118 is grounded to the common ground or return of PCBA 112, as established by wire W2 and pin 204*b*. IC 204 is a single-chip charger IC designed for typical handheld applications. It can charge and maintain a single cell Li-ion/Polymer battery operating from an AC wall adapter or a USB power source. A suitable commercially available charger IC is a Texas Instruments Model LM3658 Dual Source USB/AC Li Chemistry Charger IC for Portable Applications, manufactured by Texas Instruments Incorporated. Dallas, Tex. In an alternative embodiment, IC 204 is brought inside headset 12, e.g., incorporated in headphone unit 100*b*, and PCBA 112 is modified accordingly.

As shown in FIGS. 13A & 13C, IC 204 has two status output pins STAT 1 and STAT 2. Each pin provides a high and a low voltage output representing a binary logic one and zero, respectively. These outputs provide an indication of the charging status or condition of battery 126. For example, if STAT 1 is a logic 1 and STAT 2 is a logic 0, the status is that battery 126 is charging. If STAT 1 is a logic 0 and STAT 2 is a logic 1, the status is that battery 126 is completely charged. If STAT 1 is a logic 1 and STAT 2 is a logic 1, then a maximum charging cycle has timed out, indicating that battery 126 may be bad. These logic outputs are delivered to 2-to-4 line decoder 206 via a pair of traces 207. The STAT 1 and STAT 2 outputs of IC 204 become STAT 1 and STAT 2 inputs to decoder 206. Decoder 206 interprets the logic code of its inputs, as indicated above (01, 10, 11), to generate three separate logic outputs: BAD; FULL; and CHARGING (FIG. 13C). A suitable commercially available line decoder IC is a Texas Instruments Model SN74LVC1G139 2-to-4 Line Decoder, manufactured by Texas Instruments Incorporated, Dallas, Tex. The Model SN74LVC1G139 2-to-4 Line Decoder is designed for 1.65V to 5.5V Vcc operation.

The BAD, FULL and CHARGING outputs of decoder 206 are delivered to tricolor LED chip 208 via etched copper traces 209. The connection via traces 209 is simplified for clarity, but each path 209 may preferably include a 220-ohm series resistor. If LED chip 208 has red, green and yellow LEDs (FIG. 13C), then the coding of the BAD, FULL and CHARGING outputs is relatively straightforward. For example, if the STAT 1 input to decoder 206 is high and the STAT 2 input is low, decoder 206 will set a high level on the CHARGING output and a low level on the FULL and BAD outputs. This output state would drive the yellow LED of chip 208, causing yellow light to be generated, transmitted up light pipe assembly 120, and emitted through dome lens 121 (FIG. 13B). If the STAT 1 input is low and the STAT 2 input is high, decoder 206 will set a high level on the FULL output and a low level on the CHARGING and BAD outputs. This output state would drive the green LED of chip 208, causing green light to be generated, transmitted up light pipe assembly 120, and emitted through dome lens 121. If the STAT 1 input is high and the STAT 2 input is high, decoder 206 will set a high level on the BAD output and a low level on the CHARGING and FULL outputs. This output state would drive the red LED of chip 208, causing red light to be generated, transmitted up light pipe assembly 120, and emitted through dome lens 121. If a red, green and blue (RGB) LED chip is used, a different output-coding scheme for decoder 206 will be required or a different line decoder may be required. In the latter case, decoder 206 may be required to produce a multiple-output code to generate yellow light from red and green light. For example, if an RGB LED is used, the input to the chip may be high on the red input, high on the green input, and low on the blue input, to generate yellow light. Another alternative is to use a bicolor (red and green) LED chip, which can be driven by decoder 206 using two outputs, for example: 0,1 for green; 1,0 for red; and 1,1 for yellow. Suitable commercial tricolor and bicolor surface mount LED chips are available from Dialight Corporation, Farmingdale, N.J. For example, a Part No. 597-7791-902F or 597-7791-907F, RGY LED chip, in a PLCC-4 package, will mate with a Dialight Optopipe® Part No. 515-1194-0100DF vertical LED light pipe assembly. Another potential supplier of suitable LED chips is Avago Technologies, San Jose, Calif.

In the case where a Li-Ion or lithium polymer battery is used in headset 12, a third pogo pin may be employed on PCBA 112 to receive a temperature sensor output signal from the battery or a battery pack. Typically, such batteries include a sensor that senses the temperature of the battery during charging and issues a temperature-dependent signal based on the temperature of the battery. A third pogo pin would receive this signal and deliver it to a battery temperature sensor pin Ts of charger IC 204 (see FIG. 13C). If the temperature-dependent signal exceeds a pre-programmed threshold, charger IC 204 would either adjust or terminate the charging current delivered to the battery to avoid overheating or even catastrophic failure of the battery. In the alternative embodiment, where the charging IC is incorporated into headset 12, the need for a third pogo pin is eliminated.

Turning now to FIGS. 14A and 14B, bottom and top views of power input (or transmitter) PCBA 146 is shown, respectively. PCBA 146 includes PCB 145 and a transmitter charging circuit 300 mounted on PCB 145 (see also FIG. 14C). PCBA 146 is part of the multi-board charge distribution circuit associated with charging station 44. PCB 145 contains three mounting holes 145*a* for pan head screws 147, two thru-holes 145*b* for pogo-pins 144, and three slots 145*c* (FIG. 14B). Circuit 300 includes a 2-wire insulation displacement connector or 302 and a DC connector power jack 304 (FIGS. 14A & 14C). Also refer to FIG. 14C in connection with charging circuit 300. Connector 302 may be an IDC, 2-position, 24-gauge, Thrucap connector, Part No. 009176002732106, manufactured by AVX Corporation, Greenville, S.C. Connector 302 is preferably surface mounted to PCB 145. Jack 304 may be a mini connector power jack, Part No. RAPC712X, manufactured by Switchcraft, Inc., Chicago, Ill. Jack 304 includes three contacts 304*a* (FIG. 14B), and jack 304 is thru-hole mounted to board 145 by insertion of contacts 304*a* through slots 145C (see FIG. 14B). As shown in FIGS. 14A & 14B, pogo-pins 144 are thru-hole or reverse mounted to PCB 145 and extend from the bottom side to the top side of PCB 145. Connector 302 provides a wire-to-board connection of wires W1 and W2 (in broken lines) to PCBA 146. As will become apparent with respect to FIG. 15, wires W1, W2 actually begin at connector 302 and extend from there to receptacle PCBA's 112. For this reason, connector 302 may be an endcap (or wire stop) IDC connector rather than a thrucap (or through wire) connector. Wires W1, W2 are insulated 24-gauge bell wires. The insulation is pierced inside connector 302 as connector 302 is pushed from an extended first position to a retracted second position. Alternatively, the insulation can be pre-cut from wires W1, W2. In the second position of connector 302, an electrical connection is established between wires W1, W2 and a pair of leads or contacts (not shown), respectively, of connector 302 (at the bottom). The leads or contacts are connected to etched copper traces 303*a* and 303*b* to complete the wire-to-board connection.

Traces 303*a* and 303*b* connect connector 302 and DC power jack 304 together. Trace 303*a* is connected to the center conductor of jack 304 and trace 303*b* is connected to the reference conductor of jack 304, via contacts 304*a*. Traces 303*a* and 303*b* are also electrically coupled to pogo-pins 144, respectively, via a pair of branch traces 305*a* and 305*b*, respectively. Jack 304 (a female connector) receives a barrel (male) connector on DC power cord 57 (FIG. 4). Charging current of up to 3 amps and a voltage of up to 6 volts is delivered from power supply 56 (FIG. 4) to jack 304. This electrical power is then delivered to connector 302 via trace 303*a* and to one of the pogo-pins 144 via trace 305*a* ("positive pogo-pin"). Traces 303*b* and 305*b* establish the ground reference or return for connector 302 and pogo-pins 144. In FIG. 14A, the electrical path represented by trace 303*a* actually includes either a zero-ohm resistor R1 or a 3.5 amp fuse F, as shown in the schematic diagram of FIG. 14C. Also, the electrical path represented by trace 305*a* actually includes a zero-ohm series resistor R2 ahead of the positive pogo-pin 144 (see FIG. 14C). These elements are not shown in FIG. 14A for purpose of clarity. It should now be understood that electrical power is delivered directly from power supply 56 to pogo-pins 144, for charging transmitter 14. Connector 302 taps into this electrical power and transfers it to wires W1 and W2. As before, W1 is the positive side and W2 is the ground or return side. Wires W1, W2 run from connector 302 to off PCBA 146, and are then routed to the first of the 10 receptacle PCBA's 112 (see FIG. 15).

As shown in FIG. 14C, jack 304 has a center socket 304*b* for receiving the male barrel connector of power cord 57. Jack 304 also has a reference contact 304*c* to establish a ground reference or return for the power circuit. Electrical path 303*a* is connected to socket 304*b*. Path 303*a* includes either zero-ohm resistor R1 or fuse F, as shown. Fuse F is theoretically not required if power supply unit 56 is current limited. Path 303*a* continues to a positive connection of connector 302. The positive connection of connector 302 is connected to wire W1. Electrical path 305*a* is connected to path 303*a* and includes zero-ohm series resistor R2. Resistor R2 is included here to facilitate easy current load testing (at test points TP1 and TP2) during engineering testing. Resistor R2 may also serve as an option (i.e., a place-holder) on PCBA 146 for an additional resistance. As shown in FIG. 14C, resistor R2 is connected at its remote end to the positive pogo-pin 144. Electrical path or trace 303*b* is connected to reference contact 304*c* at one end and to a negative or return connection of connector 302 at the other end. The negative or return connection of connector 302 is connected to wire W2. Electrical path 305*b* is connected to electrical path 303*b* at one end and connected to the other pogo-pin 144 (negative pogo-pin) at the other end. It should be noted that transmitter 14 may be charged without charging tower 50 and charging circuit 300. Transmitter 14 can be equipped with a micro USB jack or connector, and a micro USB cable can be connected between any suitable DC charging source and USB-equipped transmitter 14.

Figure 15A:
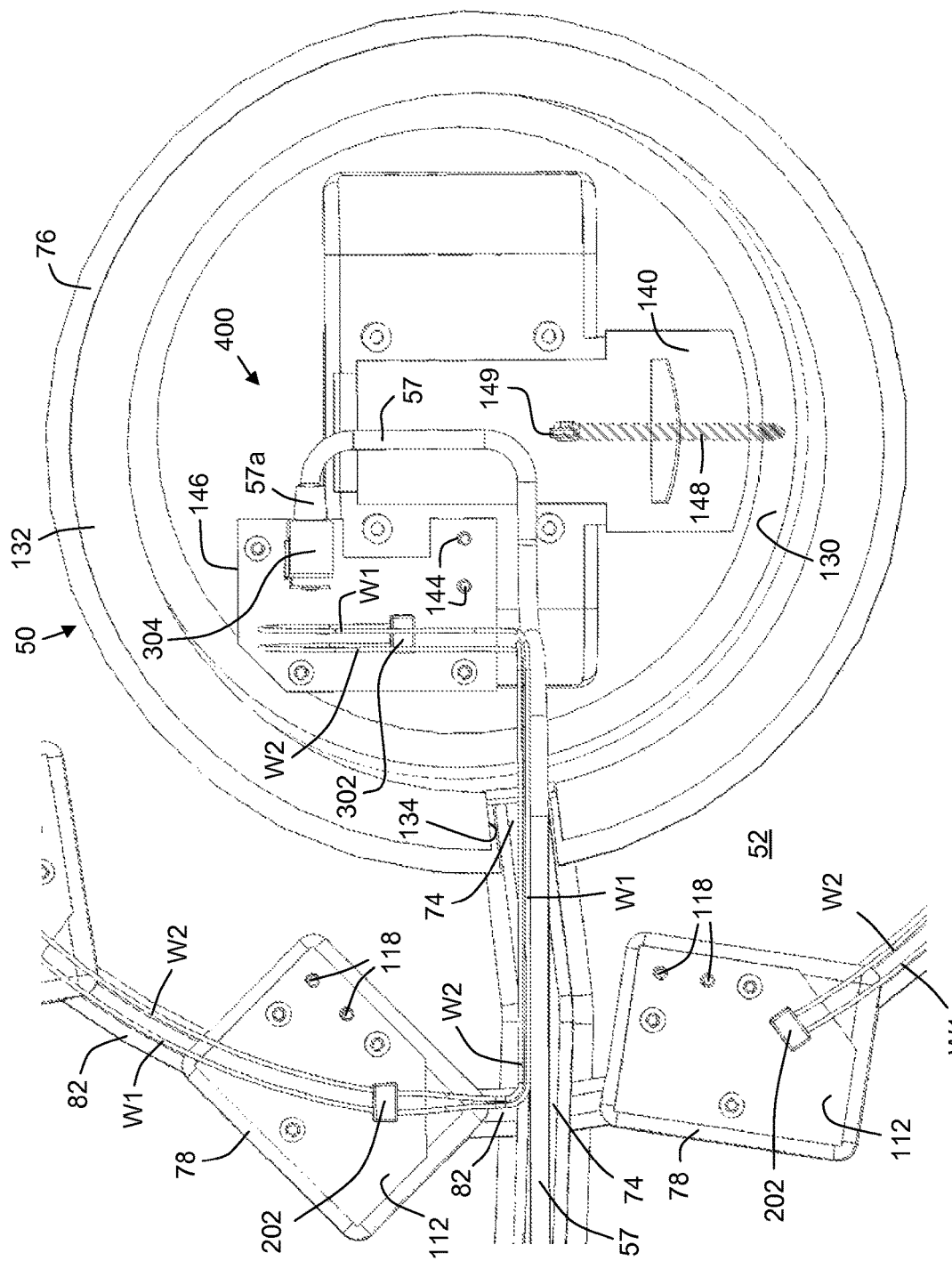
FIG. 15A is an enlarged view of a portion of the charging station of FIG. 15.

Turning now to FIG. 15, an overall view of a multi-board charge distribution circuit 400 (for charging station 44) is shown. FIG. 15 is a bottom plan view of charging station 44. As previously discussed, charging station includes foam base 46 having circular tray portion 52 and storage annex portion 54. Annex portion 54 includes hollow storage compartment 70, which connects to auxiliary chamber 72, via opening 71. Cable race or channel 74 connects to chamber 72 at one end and with the center hole (62 in FIG. 7) of base 46 at the other end. In FIG. 15, the center hole (62 in FIG. 7) is occupied by charging tower 50. An enlarged view of a portion of charging circuit 400 is shown in FIG. 15A. Reference is now made to both FIG. 15 and FIG. 15A. Flange 132 of tower 50 is shown in place in annular recess 76 of base 46. The underside of charging tower 50 reveals slide arm 140 in a latch position. Tension spring 148 is shown attached to hook 149 at one end and to the interior wall of tower portion 130 at the other end. Also shown mounted in place is power input PCBA 146. The ten PCBAs 112 are also mounted in place in recesses 78 of tray portion 52 (of foam base 46). In the alternative mold arrangement, the ten PCBAs 112 are mounted in the previously described continuous annular recess. In either arrangement, the ten PCBAs 112 form a circular pattern (FIG. 15).

Continuing with FIGS. 15 & 15A, charging circuit 400 includes: AC-to-DC power supply unit 56; DC power supply cord 57; a standard DC plug (barrel) connector 57*a* at the distal end of cord 57; transmitter charging circuit 300 (FIG. 14A), including DC power jack 304 and wire-to-board connector 302; receptacle charging circuit 200 (FIG. 13A) on each PCBA 112, including wire-to-board connector 202; and insulated bell wires W1, W2 running from connector 302 on PCBA 146 to each connector 202 on the ten PCBAs 112 (i.e., PCBA 146 and the PCBAs 112 are daisy-chained together by wires W1, W2). Power supply unit 56 is stored in compartment 70 (FIG. 15). An AC power cord with standard wall-outlet plug (not shown) is disconnected from unit 56 when unit 56 is stored in compartment 70. DC power cord 57 is permanently connected to unit 56 and extends from compartment 70, through opening 71, and into chamber 72. Cord 57 then runs through cable race 74, through tower cutout 134, and into charging tower 50 (FIGS. 15 & 15A). Plug 57a of cord 57 is inserted into DC power jack 304 (FIGS. 15 & 15A). Thus, the DC electricity from power supply unit 56 is supplied to charging circuit 300 via jack 304 (FIG. 14A). The electricity then energizes pogo-pins 144 on PCBA 146 (FIG. 15A). The electricity is also transferred to wires W1, W2 via wire-to-board connector 302. The electricity then flows to each receptacle charging circuit 200 via wire-to-board connectors 202 (FIG. 13A). Pogo-pins 118 on each PCBA 112 are then energized by the DC electricity, as regulated and managed through charger IC 204 (FIG. 13A). The electricity also powers tricolor LED chips 208. As shown in FIG. 15, wires W1, W2 run in a circular path. As shown in FIGS. 15 & 15A, wires W1, W2 are generally maintained in place by wire races 82. Note that during the charging operation of circuit 400, power supply unit 56 is removed from compartment 70. DC power cord 57 has enough reserve length stored in chamber 72 to allow for this removal without disconnecting from jack 304. A cable clamp or other strain relief mechanism (not shown) may be applied to cord 57, near its distal end, to prevent plug 57a from disconnecting from jack 304, in the event that power supply unit 56 is dropped or pulled.

Again referring to FIG. 15, PCBA's 112 are individually and separately seated in recesses 78 of foam base 46. This architecture offers an advantage of mechanically isolating the PCBA's 112 from each other and from the surrounding cylindrical base wall 28 (FIG. 4). As a result, foam base 46 assists in dampening vibrations, shocks, or stresses transmitted to base 46 by external forces and helps protect the PCBA's 112 from such vibrations, shocks or stresses. In addition, this architecture offers an advantage associated with the repair of charge distribution circuitry 400. The use of a separate PCBA 112 for each charging receptacle 48 allows one to isolate a problem on one PCBA 112 and to replace that one PCBA, rather than replacing the entire charge distribution circuit. Notwithstanding the advantages described here with respect to a multiple-board architecture, it is to be understood that the present invention is not so limited. In an alternative embodiment, the charge distribution circuitry involving at least the PCBA's 112 (i.e., charging circuits 200) may all be mounted on a single printed circuit board. In such case, the single board would be centered under charging tower 50 and extend out under charging receptacles 48. The single board may be circular in shape, but other shapes are acceptable. The single board may also include (as a further variation) charging circuit 300, eliminating PCBA 146. The single-board embodiment offers the opportunity to eliminate wires W1, W2 and connectors 202 (and connector 302), replacing them with copper traces etched on the single board. In some cases, a single-board embodiment may provide a more compact circuit package than the multiple-board design.

Figure 16:
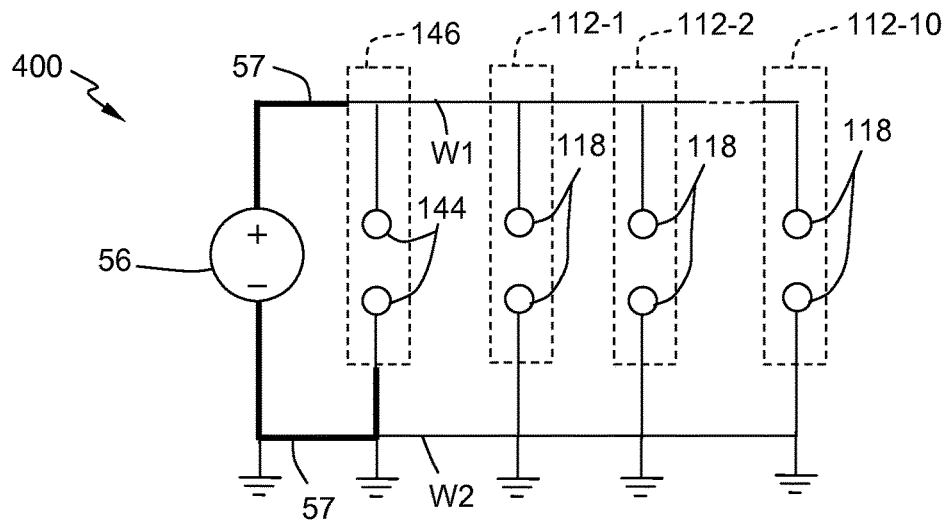
FIG. 16 is a simplified schematic diagram of the charging circuit depicted in FIG. 15.

Referring now to FIG. 16, there is shown a simplified schematic diagram of multi-board charge distribution circuit 400. Power supply unit 56, power input PCBA 146, and receptacle PCBA's 112 are represented by boxes in broken lines. The box for power supply unit 56 includes battery and resistor symbols to schematically represent DC voltage and current (electricity) to be supplied to the PCBA's. Electricity is supplied by unit 56 to PCBA 146 via DC cord 57. The electricity directly energizes pogo-pins 144 in PCBA 146. The ten receptacle PCBAs 112 are represented by boxes 112-1, 112-2 . . . and 112-10. The electricity originating from power supply unit 56 is supplied to PCBAs 112-1, 112-2 . . . 112-10 by wires W1 and W2, as represented in FIG. 16. Also, as represented in FIG. 16, pogo-pins 118 of PCBAs 112-1, 112-2 . . . 112-10 are energized by a battery charger IC (204 in FIG. 13A), which is, in turn, energized by a regulated output from power supply unit 56.

Figure 17:
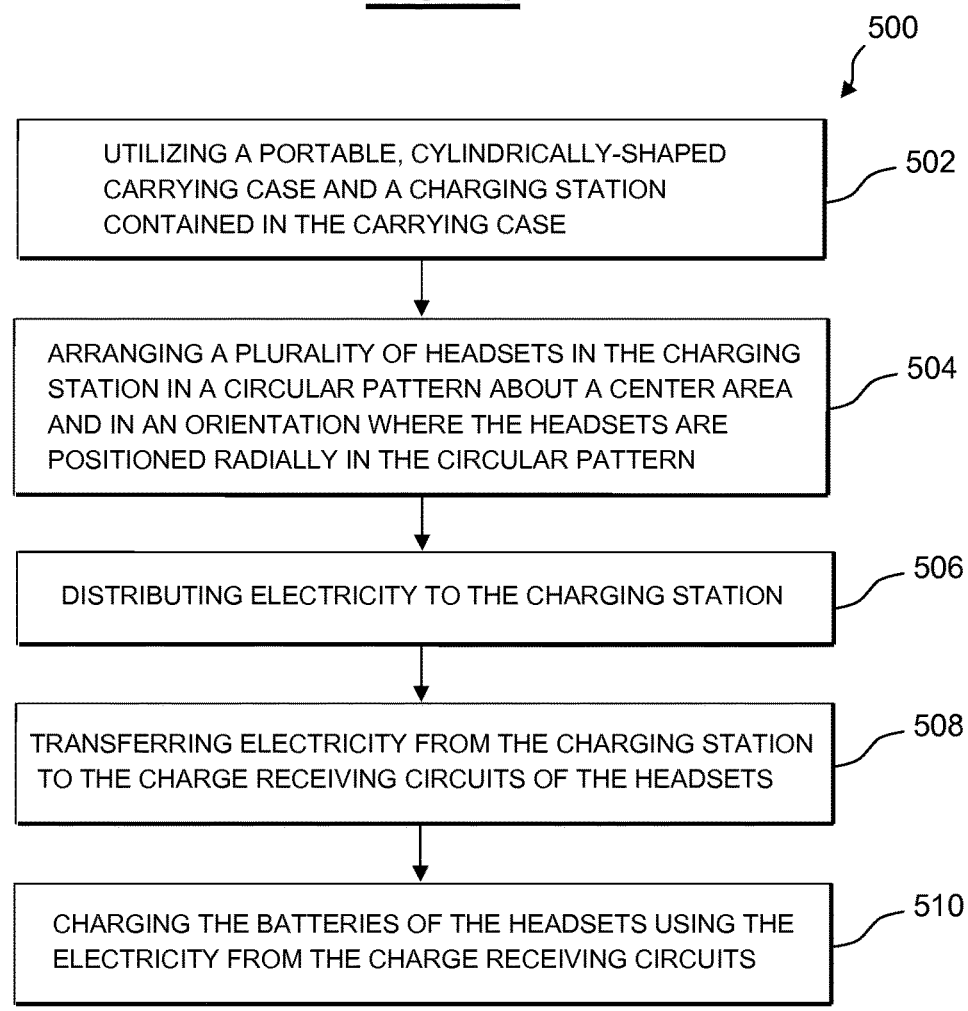
FIG. 17 is a flow diagram outlining certain steps of a preferred method of the present invention.

Referring now to FIG. 17, there is shown a flow diagram outlining a preferred method 500 of the present invention. Method 500 concerns storing and charging a plurality of wireless headsets in a charging case. Each headset includes a pair of headphone units connected together in opposing relationship along a diametric axis by a headband. Each headset contains a battery and a charge receiving circuit coupled to the battery. The preferred method comprises the steps outlined in FIG. 17. In a first step 502, a portable cylindrically shaped carrying case and a charging station contained in the carrying case are utilized. In a second step 504, the plurality of headsets are arranged in the charging station in a circular pattern about a center area and in an orientation where the diametric axes of the headsets are positioned radially in the circular pattern. In a third step 506, electricity from a power supply unit is distributed to the charging station. In a fourth step 508, the electricity from the charging station is transferred to the charge receiving circuits of the headsets. Lastly, in a fifth step 510, the batteries in the headsets are charged using the electricity from the charge receiving circuits, respectively.

Figure 18:
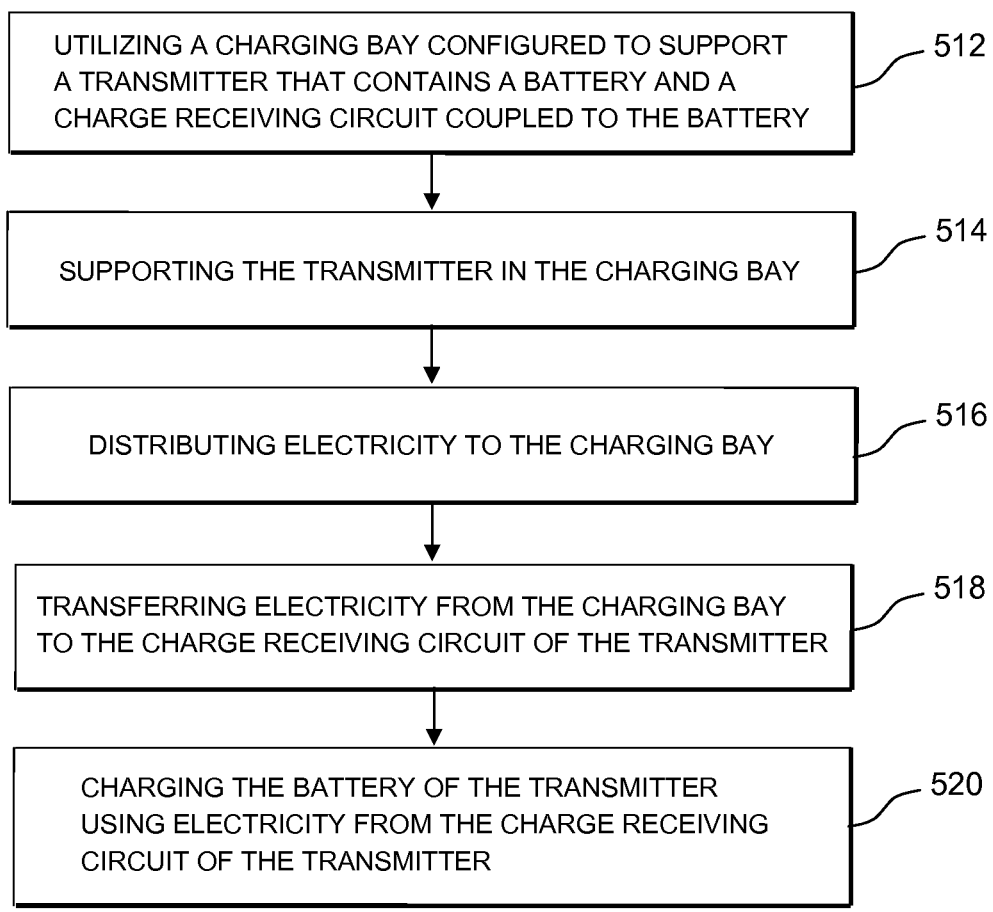
FIG. 18 is a flow diagram outlining additional steps in the preferred method of the present invention.

Method 500 may further comprise the additional steps outlined in FIG. 18. In a step 512, a charging bay is utilized in the center area of the circular pattern of the headsets. The charging bay is configured to receive and support a transmitter that contains a battery and a charge receiving circuit coupled to the battery. The transmitter is adapted to wirelessly communicate with and transmit audio signals to the headsets. In a step 514, the transmitter is supported in the charging bay for charging. In a step 516, electricity is distributed to the charging bay. In a step 518, the electricity is transferred from the charging bay to the charge receiving circuit of the transmitter. Lastly, in a step 520, the battery of the transmitter is charged using the electricity from the charge receiving circuit of the transmitter.

While the preferred embodiments of the invention have been particularly described in the specification and illustrated in the drawing, it should be understood that the invention is not so limited. Many modifications, equivalents and adaptations of the invention will become apparent to those skilled in the art without departing from the spirit and scope of the invention, as defined in the appended claims.

What is claimed is:

1. An electrical charging case for storing and charging a plurality of headsets, each headset including first and second headphone units connected together in opposing relationship along a diametric axis by a headband, and each headset containing a battery and a charge receiving circuit coupled to the battery, said charging case comprising:

(a) a portable carrying case; and
(b) a charging station, contained in said carrying case, including—
  (i) a plurality of charging receptacles disposed in a circular pattern about a center area and configured to receive and support the plurality of headsets, respectively, in an orientation where the diametric axes of the headsets are positioned radially in the circular pattern, and
  (ii) a charge distribution circuit, coupled to the plurality of charging receptacles, for distributing electricity to each of the charging receptacles, the charge distribution circuit having a charge transfer mechanism associated with each of the charging receptacles, the charge transfer mechanism of each receptacle transferring the electricity distributed to the receptacle to the charge receiving circuit of a headset of the plurality of headsets when the headset is supported in the receptacle, whereby the battery of the headset receives the electricity and is charged thereby.

2. The electrical charging case of claim 1, wherein said charging station further includes a base containing the charging receptacles.

3. The electrical charging case of claim 2, wherein the base is a separate part from the charging receptacles, the charging receptacles being received and secured in the base.

4. The electrical charging case of claim 2, wherein the base and the charging receptacles are integrally formed in a unitary structure.

5. The electrical charging case of claim 4, wherein the unitary structure of the base and the charging receptacles is made of a foam material.

6. The electrical charging case of claim 4, wherein the unitary structure of the base and the charging receptacles is made of a plastic material.

7. The electrical charging case of claim 1, wherein said charging station further includes
  (iii) a charging bay located at the center area and configured to receive and support a transmitter, the transmitter containing a battery and a charge receiving circuit coupled to the battery and being adapted to wirelessly transmit audio signals to the plurality of headsets, the charge distribution circuit being further coupled to the charging bay for distributing electricity to the bay, the charge distribution circuit having a charge transfer mechanism for transferring electricity from the bay to the charge receiving circuit of the transmitter when the transmitter is supported in the bay, whereby the battery of the transmitter receives the electricity and is charged thereby.

8. The electrical charging case of claim 7, wherein said charging station further includes a base, and wherein the base, the charging receptacles and the charging bay are integrally formed in a unitary structure.

9. The electrical charging case of claim 1, wherein said carrying case is cylindrically shaped.

10. The electrical charging case of claim 1, wherein said carrying case contains a storage space bound by a cylindrical wall, the charging receptacles being contained in the storage space and being closely spaced in the circular pattern about the center area.

11. The electrical charging case of claim 10, wherein the circular pattern of the charging receptacles is in close concentric relationship with the cylindrical wall.

12. The electrical charging case of claim 11, wherein said charging station further includes (iii) a charging bay located at the center area and in close concentric relationship with the circular pattern of the charging receptacles.

13. The electrical charging case of claim 12, wherein said carrying case has a base shell and a lid shell connected to the base shell by a hinge, the lid shell being movable about the hinge between a closed position and an open position, in the closed position the lid shell is together with the base shell such that said carrying case is closed, in the open position the lid shell is away from the base shell such that said carrying case is open.

14. The electrical charging case of claim 13, wherein the base shell has a circular base panel and a cylindrical base wall extending substantially perpendicular to and around the circular base panel, to define a base compartment,
  and wherein the lid shell has a circular lid panel and a cylindrical lid wall extending substantially perpendicular to and around the circular lid panel, to define a lid compartment.

15. The electrical charging case of claim 14, wherein the cylindrical base wall and the cylindrical lid wall each have a flat segment, the flat segments adjoining each other and being joined together by the hinge, the flat segments together forming a case base when said carrying case is closed, whereby the case base supports said carrying case in an upright position.

16. The electrical charging case of claim 15, wherein the cylindrical base wall has an interior side associated with the base compartment and an exterior side, said carrying case further including a handle, mounted to the exterior side of the base wall at a point opposing the case base, for manually carrying said carrying case when said case is closed.

17. The electrical charging case of claim 16, wherein said charging station is supported in the base shell and substantially occupies the base compartment.

18. The electrical charging case of claim 1, wherein said charging station includes a foam base having a top side and a bottom side, the top side containing a plurality of receptacle cavities in which the plurality of charging receptacles are mounted, respectively.

19. The electrical charging case of claim 18, wherein said foam base further contains a center hole extending between the top and bottom sides, the center hole being in substantial registration with the center area associated with the circular pattern of the charging receptacles, and wherein said charging station further includes a charging bay located in and extending through the center hole of the foam base.

20. The electrical charging case of claim 18, wherein the charge distribution circuit includes a plurality of individual charging circuits coupled to the plurality of charging receptacles, respectively, the charging circuits being mounted to the foam base, on the bottom side, in substantial alignment with the charging receptacles, respectively.

21. The electrical charging case of claim 1, wherein the charge distribution circuit includes a plurality of individual charging circuits associated with the plurality of charging receptacles, respectively.

22. An electrical charging case, comprising:
(a) a plurality of wireless headsets, each headset including first and second headphone units connected together in opposing relationship along a diametric axis by a headband, and each headset containing a battery and a charge receiving circuit coupled to the battery;
(b) a portable carrying case; and
(c) a charging station, contained in said carrying case, including—

(i) a plurality of charging receptacles disposed in a circular pattern about a center area and configured to receive and support said plurality of headsets, respectively, in an orientation where the diametric axes of said headsets are positioned radially in the circular pattern, and (ii) a charge distribution circuit, coupled to the plurality of charging receptacles, for distributing electricity to each of the charging receptacles, the charge distribution circuit having a charge transfer mechanism associated with each of the charging receptacles, the charge transfer mechanism of each receptacle transferring the electricity distributed to the receptacle to the charge receiving circuit of a headset of said plurality of headsets when the headset is supported in the receptacle, whereby the battery of the headset receives the electricity and is charged thereby.

23. The electrical charging case of claim 22, wherein said carrying case is cylindrically shaped.

24. The electrical charging case of claim 22, further comprising a transmitter located at the center area of said charging station, said transmitter being adapted to wirelessly transmit audio signals to the plurality of headsets.

25. The electrical charging case of claim 22, further comprising a transmitter adapted to wirelessly transmit audio signals to the plurality of headsets, said transmitter containing a battery and a charge receiving circuit coupled to the battery, and wherein said charging station further includes—

(iii) a charging bay located at the center area and configured to receive and support said transmitter, the charge distribution circuit being further coupled to the charging bay for distributing electricity to the charging bay, the charge distribution circuit having a charge transfer mechanism for transferring the electricity distributed to the bay to the charge receiving circuit of said transmitter when said transmitter is supported in the bay, whereby the battery of said transmitter receives the electricity and is charged thereby.

26. A method of storing and charging a plurality of wireless headsets, each headset including first and second headphone units connected together in opposing relationship along a diametric axis by a headband, and each headset containing a battery and a charge receiving circuit coupled to the battery, said method comprising the steps of:

(a) utilizing a portable carrying case and a charging station contained in the carrying case;

(b) arranging the plurality of headsets in the charging station in a circular pattern about a center area and in an orientation where the diametric axes of the headsets are positioned radially in the circular pattern;

(c) distributing electricity to the charging station;

(d) transferring the electricity from the charging station to the charge receiving circuits of the plurality of headsets; and (e) charging the batteries of the headsets using the electricity from the charge receiving circuits, respectively.

27. The method of claim 26, wherein the portable carrying case is cylindrically shaped and step (a) includes utilizing the portable cylindrically shaped carrying case.

28. The method of claim 26, further comprising the step of:

(f) locating a transmitter at the center area, the transmitter being adapted to transmit audio signals to the headsets.

29. The method of claim 26, further comprising the steps of:

(f) locating a transmitter at the center area, the transmitter containing a battery and a charge receiving circuit coupled to the battery and being adapted to transmit audio signals to the headsets;

(g) transferring the electricity from the charging station to the charge receiving circuit of the transmitter; and (h) charging the battery of the transmitter using the electricity from the charge receiving circuit of the transmitter.

* * * * *